US010528970B2

(12) United States Patent
Song et al.

(10) Patent No.: US 10,528,970 B2
(45) Date of Patent: Jan. 7, 2020

(54) SYSTEMS, METHODS, AND DEVICES FOR PIPELINED PROCESSING OF ONLINE ADVERTISING PERFORMANCE DATA

(71) Applicant: Amoboe, Inc., Redwood City, CA (US)

(72) Inventors: Bin Song, Redwood City, CA (US); Khaled Elmeleegy, Redwood City, CA (US); ShaoSu Liu, Redwood City, CA (US); Santanu Kolay, Redwood City, CA (US); Lawrence Lo, Redwood City, CA (US)

(73) Assignee: Amobee, Inc., Redwood City, CA (US)

( * ) Notice: Subject to any disclaimer, the term of this patent is extended or adjusted under 35 U.S.C. 154(b) by 1314 days.

(21) Appl. No.: 14/557,416

(22) Filed: Dec. 1, 2014

(65) Prior Publication Data

US 2016/0155141 A1    Jun. 2, 2016

(51) Int. Cl.
*G06Q 30/02* (2012.01)
*G06F 16/24* (2019.01)

(52) U.S. Cl.
CPC .............................. *G06Q 30/0242* (2013.01)

(58) Field of Classification Search
CPC ......... G06Q 30/02; G06F 16/24; G06F 16/90; G06F 16/25
See application file for complete search history.

(56) References Cited

U.S. PATENT DOCUMENTS

| 8,423,558 | B2 * | 4/2013 | Kilroy | G06Q 30/0269 705/14.49 |
| 9,245,279 | B2 * | 1/2016 | Hsiao | G06Q 30/02 |
| 2009/0094073 | A1 * | 4/2009 | Cheung | G06Q 30/02 705/14.47 |
| 2011/0066496 | A1 * | 3/2011 | Zhang | G06F 17/30867 705/14.53 |
| 2011/0246267 | A1 * | 10/2011 | Williams | G06Q 30/02 705/14.4 |
| 2015/0154632 | A1 * | 6/2015 | Jindal | G06Q 30/0246 705/14.45 |

* cited by examiner

Primary Examiner — Sun M Li
Assistant Examiner — Thuy N Nguyen
(74) Attorney, Agent, or Firm — Kwan & Olynick LLP

(57) ABSTRACT

Systems, methods, and apparatus are disclosed for identifying and analyzing online advertising performance data. Systems may receive data records that include data events characterizing interactions between users and online advertisement campaigns. The online advertising data records may include timestamp data characterizing creation dates for data events. The systems may generate intermediate data objects by partitioning at least some of the online advertising data records based on a first plurality of temporal data categories representing different units of time. Each intermediate data object may be associated with a temporal data category of the first plurality of temporal data categories. The systems may generate performance data objects by partitioning the intermediate data objects based on a second plurality of temporal data categories that are different than the first temporal data categories. Each performance data object may be associated with a temporal data category of the second plurality of temporal data categories.

19 Claims, 10 Drawing Sheets

SYSTEMS, METHODS, AND DEVICES FOR PIPELINED PROCESSING OF ONLINE ADVERTISING PERFORMANCE DATA

TECHNICAL FIELD

This disclosure generally relates to online advertising, and more specifically to identifying and analyzing performance data associated with online advertising.

BACKGROUND

In online advertising, internet users are presented with advertisements as they browse the internet using a web browser or mobile application. Online advertising is an efficient way for advertisers to convey advertising information to potential purchasers of goods and services. It is also an efficient tool for non-profit/political organizations to increase the awareness in a target group of people. The presentation of an advertisement to a single internet user is referred to as an ad impression.

Billions of display ad impressions are purchased on a daily basis through public auctions hosted by real time bidding (RTB) exchanges. In many instances, a decision by an advertiser regarding whether to submit a bid for a selected RTB ad request is made in milliseconds. Advertisers often try to buy a set of ad impressions to reach as many targeted users as possible. Advertisers may seek an advertiser-specific action from advertisement viewers. For instance, an advertiser may seek to have an advertisement viewer purchase a product, fill out a form, sign up for e-mails, and/or perform some other type of action. An action desired by the advertiser may also be referred to as a conversion.

SUMMARY

Systems, methods, and devices are disclosed herein for identifying and analyzing performance data associated with online advertising. Systems may include a first processing node configured to receive a plurality of online advertising data records, the plurality of online advertising data records including a plurality of data events characterizing a plurality of interactions between at least one user and an online advertisement campaign, and the plurality of online advertising data records including timestamp data characterizing a plurality of creation dates associated with the plurality of data events. The systems may further include a second processing node configured to generate a plurality of intermediate data objects by partitioning at least some of the plurality of online advertising data records based on a first plurality of temporal data categories, each temporal data category of the first plurality of temporal data categories representing a different unit of time, and each intermediate data object of the plurality of intermediate data objects being associated with a temporal data category of the first plurality of temporal data categories. The systems may also include a third processing node configured to generate a plurality of performance data objects by partitioning the plurality of intermediate data objects based on a second plurality of temporal data categories, the second plurality of temporal data categories being different than the first plurality of temporal data categories, and each performance data object of the plurality of performance data objects being associated with a temporal data category of the second plurality of temporal data categories.

In some embodiments, the first processing node is further configured to generate a plurality of aggregate data objects by partitioning the online advertising data records based on a third plurality of temporal data categories, the plurality of aggregate data objects being generated incrementally, and the generating of the plurality of aggregate data objects being responsive to receiving at least some of the plurality of online advertising data records. Moreover, the plurality of intermediate data objects may be generated based, at least in part, on the plurality of aggregate data objects. In various embodiments, each intermediate data object of the plurality of intermediate data objects includes a sequential representation of at least one online advertising data record identified based on a temporal category of the first plurality of categories, and the first plurality of temporal data categories includes at least one of a day, week, and month.

In some embodiments, at least one performance data object of the plurality of performance data objects is generated by combining two or more intermediate data objects, and where the plurality of intermediate data objects and the plurality of performance data objects are stored in a data storage system configured to process performance data queries. The systems may further include a fourth processing node configured to receive a query request from an advertisement campaign management application program interface (API), execute the query on the plurality of intermediate data objects and the plurality of performance data objects stored in the data storage system, and generate a result object that includes a result of the query. In various embodiments the result object includes a combination of at least one intermediate data object and at least one performance data object. In some embodiments, the fourth processing node is configured to identify the at least one intermediate data object and at least one performance data object included in the combination based, at least in part, on the first and second temporal data categories associated with the at least one intermediate data object and at least one performance data object, and include the at least one intermediate data object and at least one performance data object in the result object.

The systems may also include a fifth processing node configured to identify a plurality of duplicative data events included in the plurality of online advertising data records, and remove the plurality of duplicative data events from the plurality of online advertising data records. In some embodiments, the systems further include a sixth processing node configured to identify a plurality of actions based, at least in part, on the plurality of data events included in the plurality of online advertising data records, the plurality of actions being responsive to a plurality of impressions included in the online advertisement campaign. In some embodiments, the first processing node, the second processing node, and the third processing node are pipelined. In various embodiments, the plurality of intermediate data objects and the plurality of performance data objects are stored in a distributed database system.

Also disclosed herein are devices that may include a data aggregator configured to receive a plurality of online advertising data records, the plurality of online advertising data records including a plurality of data events characterizing a plurality of interactions between at least one user and an online advertisement campaign, and the plurality of online advertising data records including timestamp data characterizing a plurality of creation dates associated with the plurality of data events. The devices may also include an intermediate data object generator configured to generate a plurality of intermediate data objects by partitioning at least some of the plurality of online advertising data records based on a first plurality of temporal data categories, each temporal data category of the first plurality of temporal data categories representing a different unit of time, and each intermediate data object of the plurality of intermediate data objects being associated with a temporal data category of the first plurality of temporal data categories. The devices may further include a performance data object generator configured to generate a plurality of performance data objects by partitioning the plurality of intermediate data objects based on a second plurality of temporal data categories, the second plurality of temporal data categories being different than the first plurality of temporal data categories, and each performance data object of the plurality of performance data objects being associated with a temporal data category of the second plurality of temporal data categories.

In some embodiments, the data aggregator is further configured to generate a plurality of aggregate data objects by partitioning the online advertising data records based on a third plurality of temporal data categories, the plurality of aggregate data objects being generated incrementally, and the generating of the plurality of aggregate data objects being responsive to receiving at least some of the plurality of online advertising data records. In various embodiments, each intermediate data object of the plurality of intermediate data objects includes a sequential representation of at least one online advertising data record identified based on a temporal category of the first plurality of categories, and the first plurality of temporal data categories includes at least one of a day, week, and month. In some embodiments, at least one performance data object of the plurality of performance data objects is generated by combining two or more intermediate data objects, and the plurality of intermediate data objects and the plurality of performance data objects are stored in a data storage system configured to process performance data queries.

In some embodiments, the devices further include a query node configured to receive a query request from an advertisement campaign management application program interface (API), execute the query on the plurality of intermediate data objects and the plurality of performance data objects stored in the data storage system, and generate a result object that includes a result of the query, where result object includes a combination of at least one intermediate data object and at least one performance data object. In some embodiments, the query node may be configured to identify the at least one intermediate data object and at least one performance data object included in the combination based, at least in part, on the first and second temporal data categories associated with the at least one intermediate data object and at least one performance data object, and include the at least one intermediate data object and at least one performance data object in the result object.

Also disclosed herein are one or more non-transitory computer readable media having instructions stored thereon for performing a method, the method including receiving a plurality of online advertising data records, the plurality of online advertising data records including a plurality of data events characterizing a plurality of interactions between at least one user and an online advertisement campaign, and the plurality of online advertising data records including timestamp data characterizing a plurality of creation dates associated with the plurality of data events. The method may further include generating a plurality of intermediate data objects by partitioning at least some of the plurality of online advertising data records based on a first plurality of temporal data categories, each temporal data category of the first plurality of temporal data categories representing a different unit of time, and each intermediate data object of the plurality of intermediate data objects being associated with a temporal data category of the first plurality of temporal data categories. The method may also include generating a plurality of performance data objects by partitioning the plurality of intermediate data objects based on a second plurality of temporal data categories, the second plurality of temporal data categories being different than the first plurality of temporal data categories, and each performance data object of the plurality of performance data objects being associated with a temporal data category of the second plurality of temporal data categories.

In some embodiments, the method further comprises receiving a query request from an advertisement campaign management application program interface (API), executing the query on the plurality of intermediate data objects and the plurality of performance data objects, and generating a result object that includes a result of the query, wherein result object includes a combination of at least one intermediate data object and at least one performance data object.

Details of one or more embodiments of the subject matter described in this specification are set forth in the accompanying drawings and the description below. Other features, aspects, and advantages will become apparent from the description, the drawings, and the claims.

DETAILED DESCRIPTION

Figure 1:
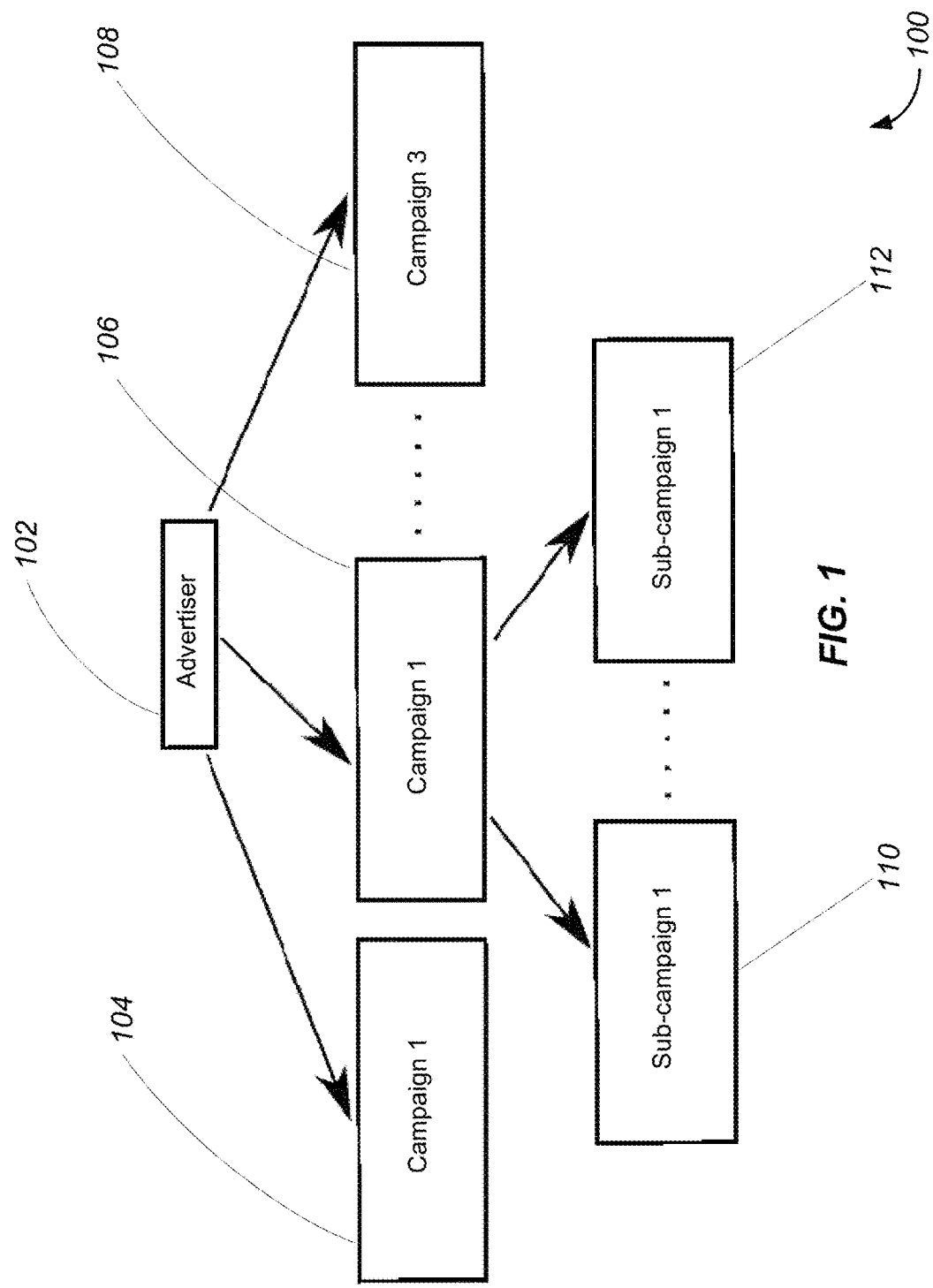
FIG. 1 illustrates an example of an advertiser hierarchy, implemented in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

In online advertising, advertisers often try to provide the best ad for a given user in an online context. Advertisers often set constraints which affect the applicability of the advertisements. For example, an advertiser might try to target only users in a particular geographical area or region who may be visiting web pages of particular types for a specific campaign. Thus, an advertiser may try to configure a campaign to target a particular group of end users, which may be referred to herein as an audience. As used herein, a campaign may be an advertisement strategy which may be implemented across one or more channels of communication. Furthermore, the objective of advertisers may be to receive as many user actions as possible by utilizing different campaigns in parallel. As previously discussed, an action may be the purchase of a product, filling out of a form, signing up for e-mails, and/or some other type of action. In some embodiments, actions or user actions may be advertiser-defined and may include an affirmative act performed by a user, such as inquiring about or purchasing a product and/or visiting a certain page.

In various embodiments, an ad from an advertiser may be shown to a user with respect to publisher content, which may be a website or mobile application if the value for the ad impression opportunity is high enough to win in a real-time auction. Advertisers may determine a value associated with an ad impression opportunity by determining a bid. In some embodiments, such a value or bid may be determined based on the probability of receiving an action from a user in a certain online context multiplied by the cost-per-action goal an advertiser wants to achieve. Once an advertiser, or one or more demand-side platforms that act on their behalf, wins the auction, it is responsible to pay the amount that is the winning bid.

Data objects and data events associated with advertisement campaign activity may be generated by various entities, such as servers and browsers, during the implementation of an advertisement campaign. Accordingly, such data may be performance data that may be indicative of a performance of one or more advertisement campaigns. For example, such data may be analyzed to determine various performance metrics, such as a return-on-investment, which may characterize or describe a return-on-investment provided by an advertisement campaign during a particular period of time. Because a system may have millions of associated users, the amount of performance data generated during a time period being analyzed may be very large. For example, in a single day, many terabytes of records and log files may be generated by a single advertisement campaign implemented by an advertiser. The performance data may include metadata, such as a timestamp, for each record in the raw logs. Based on the timestamp, performance data may be analyzed for a designated time or data range. For example, an advertiser may request performance metrics for an advertisement campaign's performance over the past thirty days. The performance data may include data objects and data events identifying a number of impressions, clicks, actions, revenue, and/or inventory cost for the advertisement campaign.

Conventional techniques for analyzing performance data remain limited because they are not able to effectively and efficiently process queries for performance data associated with advertisement campaigns. Conventional techniques may implement burdensome database queries that are not practical to implement in real time due to the large amount of performance data being analyzed, and being constantly generated as the online advertisement activity continues. Moreover, such queries are not performed incrementally and result in large and inefficient redundancies in data processing. Furthermore, conventional techniques are not able to maintain cached performance data for extended periods of time or with consistency, thus making the analysis of such data impractical to implement in a real-time environment. Accordingly, conventional techniques are not scalable and cannot be implemented with an efficiency or consistency that enables efficient real-time analysis of performance data associated with online advertisement campaigns.

Various methods, systems, and devices are disclosed herein that provide a data processing pipeline for processing performance data associated with online advertisement campaigns. In various embodiments, the data processing pipeline may be a time series based pipeline that may include one or more processing stages to pre-process or pre-compute time series data. For example, as disclosed herein, a system may aggregate raw log files and data into aggregate data objects to implement an initial stage of processing that arranges the raw data based on a collection or generation date. The system may generate several intermediate data objects that represent performance data over different designated time periods, such as days, weeks, and months. The system may then generate performance data objects which may represent performance data over a specific time period which may be determined by an entity, such as an advertiser, or may be determined based on one or more default configurations. The performance data objects may be stored or cached in a data storage system. Accordingly, when performance data is subsequently requested by an advertiser for analysis, the generated performance data objects may be queried, thus reducing burdensome queries that might otherwise be performed to obtain the underlying data, and thus enabling the efficient and consistent analysis of performance data.

FIG. 1 illustrates an example of an advertiser hierarchy, implemented in accordance with some embodiments. As previously discussed, advertisement servers may be used to implement various advertisement campaigns to target various users or an audience. In the context of online advertising, an advertiser, such as the advertiser 102, may display or provide an advertisement to a user via a publisher, which may be a web site, a mobile application, or other browser or application capable of displaying online advertisements. The advertiser 102 may attempt to achieve the highest number of user actions for a particular amount of money spent, thus maximizing the return on the amount of money spent. Accordingly, the advertiser 102 may create various different tactics or strategies to target different users. Such different tactics and/or strategies may be implemented as different advertisement campaigns, such as campaign 104, campaign 106, and campaign 108, and/or may be implemented within the same campaign. Each of the campaigns and their associated sub-campaigns may have different targeting rules which may be referred to herein as an audience segment. For example, a sports goods company may decide to set up a campaign, such as campaign 104, to show golf equipment advertisements to users above a certain age or income, while the advertiser may establish another campaign, such as campaign 106, to provide sneaker advertisements towards a wider audience having no age or income restrictions. Thus, advertisers may have different campaigns for different types of products. The campaigns may also be referred to herein as insertion orders.

Each campaign may include multiple different sub-campaigns to implement different targeting strategies within a single advertisement campaign. In some embodiments, the use of different targeting strategies within a campaign may establish a hierarchy within an advertisement campaign. Thus, each campaign may include sub-campaigns which may be for the same product, but may include different targeting criteria and/or may use different communications or media channels. Some examples of channels may be different social networks, streaming video providers, mobile applications, and web sites. For example, the sub-campaign 110 may include one or more targeting rules that configure or direct the sub-campaign 110 towards an age group of 18-34 year old males that use a particular social media network, while the sub-campaign 112 may include one or more targeting rules that configure or direct the sub-campaign 112 towards female users of a particular mobile application. As similarly stated above, the sub-campaigns may also be referred to herein as line items.

Accordingly, an advertiser 102 may have multiple different advertisement campaigns associated with different products. Each of the campaigns may include multiple sub-campaigns or line items that may each have different targeting criteria. Moreover, each campaign may have an associated budget which is distributed amongst the sub-campaigns included within the campaign to provide users or targets with the advertising content.

Figure 2:
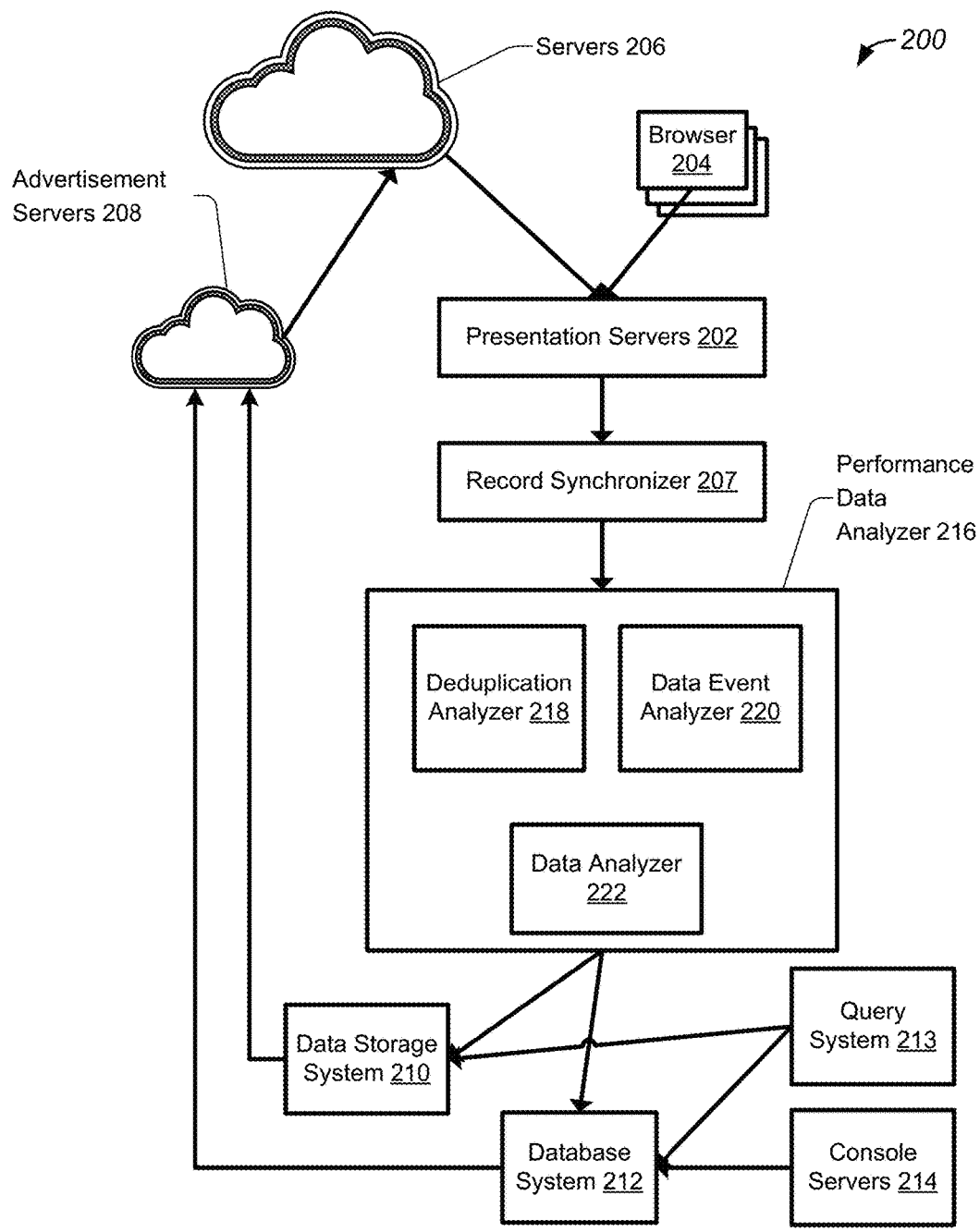
FIG. 2 illustrates a diagram of an example of a system for processing online advertising data, implemented in accordance with some embodiments.

FIG. 2 illustrates a diagram of an example of a system for processing online advertising data, implemented in accordance with some embodiments. As similarly discussed above, in the context of online advertising, millions of users may be presented with advertisement content managed by advertisement campaigns that may be implemented via many channels of communication. In various embodiments, processing such large amounts of data may result in highly accurate performance metrics associated with the advertisement campaigns. Accordingly, a system, such as system 200, may be implemented to receive data characterizing interactions between the users and the advertisement campaigns. Moreover, system 200 may be implemented to process the large amounts of data generated by these interactions such that subsequent queries for the data may be executed quickly, efficiently, and in real-time, thus ensuring that an advertiser may quickly and effectively analyze the performance of an advertisement campaign based on the most recent and up-to-date data.

In various embodiments, system 200 may include one or more presentation servers, such as presentation servers 202. According to some embodiments, presentation servers 202 may be configured to aggregate various online advertising data from several data sources. The online advertising data may include live internet data traffic that may be associated with users, as well as variety of supporting tasks. For example, the online advertising data may include one or more data values identifying various impressions, clicks, data collection events, and/or beacon fires that may characterize interactions between users and one or more advertisement campaigns. As discussed herein, such data may also be described as performance data that may form the underlying basis of analyzing a performance of one or more advertisement campaigns. In some embodiments, presentation servers 202 may be front-end servers that may be configured to process a large number of real-Internet users, and associated SSL handling. The front-end servers may be configured to generate and receive messages to communicate with other servers in system 200. In some embodiments, the front-end servers may be configure to perform logging of events that are periodically collected and sent to additional components of system 200 for further processing.

As similarly discussed above, presentation servers 202 may be communicatively coupled to one or more data sources such as browser 204 and server 206. In some embodiments, browser 204 may be an Internet browser that may be running on a client machine associated with a user. Thus, a user may use browser 204 to access the Internet and receive advertisement content via browser 204. Accordingly, various clicks and other actions may be performed by the user via browser 204. Moreover, browser 204 may be configured to generate various online advertising data described above. For example, various cookies, advertisement identifiers, beacon fires, and user identifiers may be identified by browser 204 based on one or more user actions, and may be transmitted to presentation servers 202 for further processing. As discussed above, various additional data sources may also be communicatively coupled with presentation servers 202 and may also be configured to transmit similar identifiers and online advertising data based on the implementation of one or more advertisement campaigns by various advertisement servers, such as advertisement servers 208 discussed in greater detail below. For example, the additional data servers may include servers 206 which may process bid requests and generate one or more data events associated with providing online advertisement content based on the bid requests. Thus, servers 206 may be configured to generate data events characterizing the processing of bid requests and implementation of an advertisement campaign. Such bid requests may be transmitted to presentation servers 202.

In various embodiments, system 200 may further include record synchronizer 207 which may be configured to receive one or more records from various data sources that characterize the user actions and data events described above. In some embodiments, the records may be log files that include one or more data values characterizing the substance of the user action or data event, such as a click or conversion. The data values may also characterize metadata associated with the user action or data event, such as a timestamp identifying when the user action or data event took place. According to various embodiments, record synchronizer 207 may be further configured to transfer the received records, which may be log files, from various end points, such as presentation servers 202, browser 204, and servers 206 described above, to a data storage system, such as data storage system 210 described in greater detail below. Accordingly, record synchronizer 207 may be configured to handle the transfer of log files from various end points located at different locations throughout the world to distributed file system 210 as well as other components of system 200, such as performance data analyzer 216 discussed in greater detail below. In some embodiments, record synchronizer 207 may be configured and implemented as a MapReduce system that is configured to implement a MapReduce job to directly communicate with a communications port of each respective endpoint and periodically download new log files.

As discussed above, system 200 may further include advertisement servers 208 which may be configured to implement one or more advertisement operations. For example, advertisement servers 208 may be configured to store budget data associated with one or more advertisement campaigns, and may be further configured to implement the one or more advertisement campaigns over a designated period of time. In some embodiments, the implementation of the advertisement campaign may include identifying actions or communications channels associated with users targeted by advertisement campaigns, placing bids for impression opportunities, and serving content upon winning a bid. In some embodiments, the content may be advertisement content, such as an Internet advertisement banner, which may be associated with a particular advertisement campaign. The terms "advertisement server" and "advertiser" are used herein generally to describe systems that may include a diverse and complex arrangement of systems and servers that work together to display an advertisement to a user's device. For instance, this system will generally include a plurality of servers and processing nodes for performing different tasks, such as bid management, bid exchange, advertisement and campaign creation, content publication, etc. Accordingly, advertisement servers 208 may be configured to generate one or more bid requests based on various advertisement campaign criteria. As discussed above, such bid requests may be transmitted to servers 206.

In various embodiments, system 200 may include data storage system 210. In some embodiments, data storage system 210 may be implemented as a distributed file system. As similarly discussed above, in the context of processing online advertising data from the above described data sources, there may be many terabytes of log files generated every day. Accordingly, data storage system 210 may be implemented as a distributed file system configured to process such large amounts of data. In one example, data storage system 210 may be implemented as a Hadoop® Distributed File System (HDFS) that includes several Hadoop® clusters specifically configured for processing and computation of the received log files. For example, data storage system 210 may include two Hadoop® clusters where a first cluster is a primary cluster including one primary namenode, one standby namenode, one secondary namenode, one Jobtracker, and one standby Jobtracker. The second node may be utilized for recovery, backup, and time-costing query. In some embodiments, data storage system 210 may be implemented within the context of geographically distributed data centers having about 100% fail-over redundancy, and about 99.99% uptime. Accordingly, data storage system 210 may be implemented in one or more data centers utilizing any suitable multiple redundancy and failover techniques.

In various embodiments, system 200 may also include database system 212 which may be configured to store data generated by performance data analyzer 216, discussed in greater detail below. In some embodiments, database system 212 may be implemented as one or more clusters having one or more nodes. For example, database system 212 may be implemented as a four-node RAC cluster. Two nodes may be configured to process system metadata, and two nodes may be configured to process various online advertisement data, which may be performance data, that may be utilized by performance data analyzer 216. In various embodiments, database system 212 may be implemented as a scalable database system which may be scaled up to accommodate the large quantities of online advertising data handled by system 200. For example, database system 212 may be implemented as 40 MySQL instances in a distributed database system. Additional instances may be generated and added to database system 212 by making configuration changes, but no additional code changes. In various embodiments, database system 212 may be implemented as a combination of RAC clusters and a scalable distributed database system. As will be discussed in greater detail below data storage system 210 and database system 212 may be coupled to a query server or query system, such as query system 213.

In various embodiments, database system 212 may be communicatively coupled to console servers 214 which may be configured to execute one or more front-end applications. For example, console servers 214 may be configured to provide application program interface (API) based configuration of advertisements and various other advertisement campaign data objects. Accordingly, an advertiser may interact with and modify one or more advertisement campaign data objects via the console servers. In this way, specific configurations of advertisement campaigns may be received via console servers 214, stored in database system 212, and accessed by advertisement servers 208 which may also be communicatively coupled to database system 212. Moreover, console servers 214 may be configured to receive requests for analyses of performance data, and may be further configured to generate one or more messages that transmit such requests to other components of system 200.

In various embodiments, performance data analyzer 216 may be configured to process performance data included in the online advertisement data to enable efficient and effective updating of the performance data stored in database system 212. For example, performance data analyzer 216 may include one or more data processing nodes, such as deduplication analyzer 218. In some embodiments, deduplication analyzer 218 may be configured to analyze the received performance data, identify duplicative data objects, and remove the duplicative data objects. For example, performance data associated with a particular advertisement campaign may include duplicative data objects generated by an end-user clicking on an advertisement from a particular advertisement campaign multiple times. In this example, the performance data may be processed to identify only the first click. Accordingly, deduplication analyzer 218 may be configured to remove or delete all subsequent data objects identifying the subsequent clicks. In some embodiments, deduplication analyzer 218 may be configured to deduplicate the performance data by implementing a MapReduce job which, as discussed in greater detail below with reference to FIG. 8, may include a mapping phase configured to read log files and partition them, and a reducing phase configured to identify and discard duplicative data events, such as clicks. In various embodiments, deduplication implemented by deduplication analyzer 218 removes clicks that may be performed by bots, which may be identified based on a comparison of one or more identifier strings with a list of robot strings available from a third party data source, such as the Interactive Advertising Bureau (IAB).

In various embodiments, performance data analyzer 216 may also include data event analyzer 220. According to various embodiments, data event analyzer 220 may be configured to analyze the received performance data, identify one or more data events included in the performance data, and determine a relationship between one or more advertisements or impressions and the one or more actions. Accordingly, as will be discussed in greater detail below with reference to FIG. 8, data event analyzer 220 may be configured to process the received performance data to properly identify particular actions associated with particular advertisements or impressions to accurately characterize the performance of one or more advertisement campaigns implemented by system 200. In various embodiments, once the actions have been processed by data event analyzer 220, a transaction log record may be generated and used by another system component, such as data analyzer 222 discussed in greater detail below.

System 200 may further include data analyzer 222 which may be configured to aggregate the performance data and populate a data store used to store and maintain the performance data, such as database system 212. As discussed in greater detail below with reference to FIG. 3, data analyzer 222 may include one or more components configured to aggregate, arrange, and cache the performance data to enable storage of the large amounts of performance data in database system 212. As previously discussed, conventional techniques are not able to support the processing of such large amounts of data which may be generated and updated frequently. As will be discussed in greater detail below, data analyzer 222 may be configured to include a data aggregator, an intermediate data object generator, and a performance data object generator which collectively process the received performance data to reduce the processing burden of subsequent queries of the performance data. In some embodiments, the processed data may be stored in database system 212 and/or data storage system 210. Once stored, the processed performance data may be queried by an API which may be executed by, for example, console servers 214.

Figure 3:
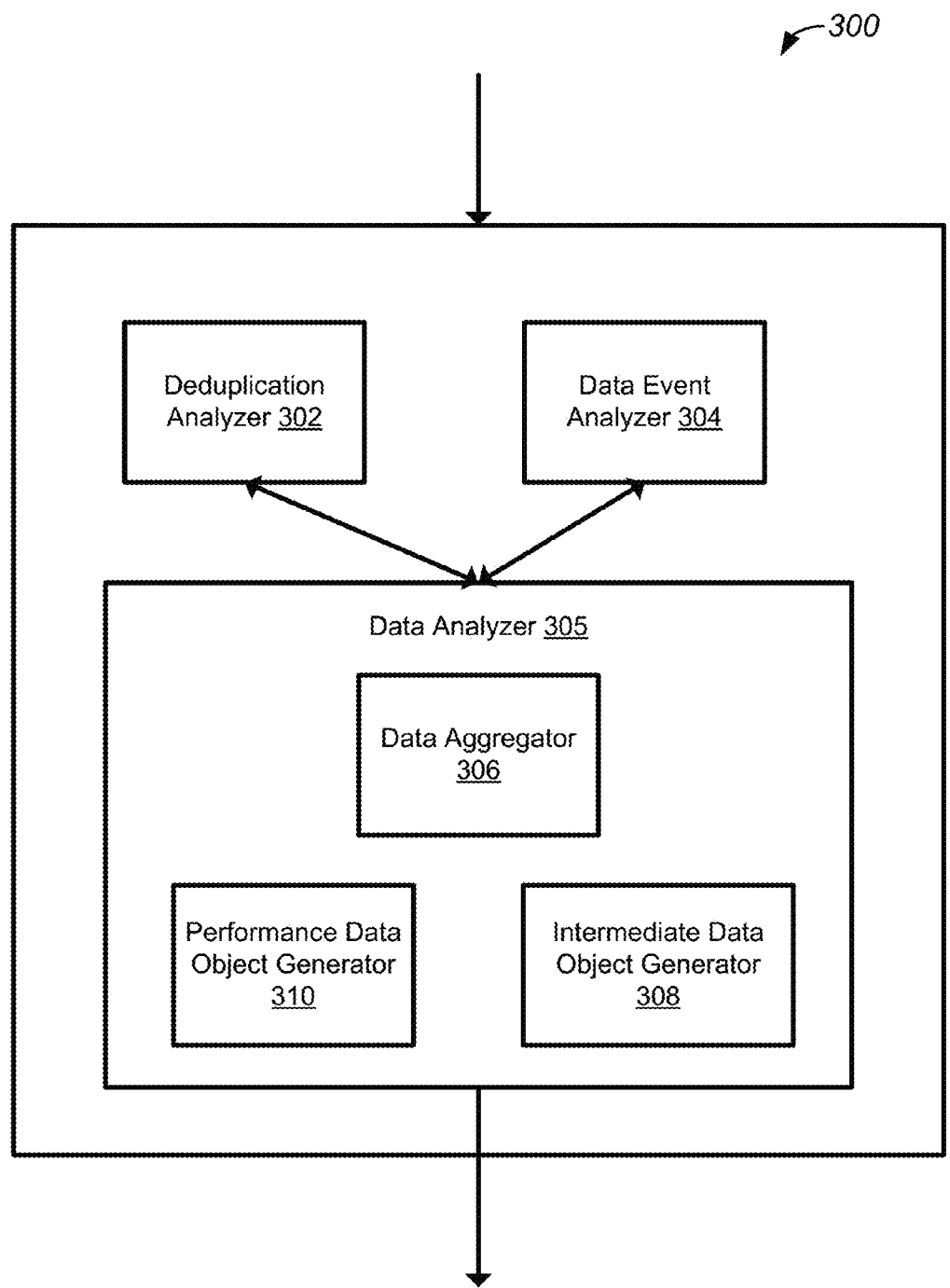
FIG. 3 illustrates a diagram of an example of a performance data analyzer that may be configured to generate one or more data objects that facilitate the analysis of online advertising data, implemented in accordance with some embodiments.

FIG. 3 illustrates a diagram of an example of a performance data analyzer that may be configured to generate one or more data objects that facilitate the analysis of online advertising data, implemented in accordance with some embodiments. As similarly discussed above with reference to FIG. 2, systems as disclosed herein may include one or more performance data analyzers, such as performance data analyzer 300, that may be configured to process large amounts of performance data associated with advertisement campaigns As similarly discussed above with reference to FIG. 2, performance data analyzer 300 may include deduplication analyzer 302 which may be configured to analyze the received performance data, identify duplicative data objects, and remove the duplicative data objects. As will be discussed in greater detail below with reference to FIG. 8, deduplication analyzer 302 may be configured to identify and remove such duplicative data objects or data events thus reducing the overall amount of data processed by performance data analyzer 300. Moreover, as previously discussed, performance data analyzer 300 may include data event analyzer 304 which may be configured to analyze received performance data, identify one or more data events included in the performance data, and determine a relationship between one or more advertisements or impressions and the one or more actions. As will be discussed in greater detail below with reference to FIG. 8, data event analyzer 304 may be configured to process the received performance data to properly identify particular actions associated with particular advertisements or impressions to accurately characterize the performance of one or more advertisement campaigns implemented by an advertiser.

As discussed above with reference to FIG. 2, performance data analyzer 300 may further include data analyzer 305 which may further include data aggregator 306. In some embodiments, data aggregator 306 may be configured to aggregate received log files received from various data sources, such as a presentation server. Data aggregator 306 may be configured to package the aggregated log files in one or more aggregate data objects. Accordingly, data aggregator may perform an initial data processing operation on the raw log data that has been received from the various data sources. As will be discussed in greater detail below with reference to FIG. 8, data aggregator 306 may be configured to aggregate log files associated with data events into data objects which may be arranged or partitioned based on a characteristic or feature of the data events. Data aggregator 306 may be further configured to store the aggregate data objects in a data storage system.

In various embodiments, data analyzer 305 may further include intermediate data object generator 308 which may be configured to further arrange or package the aggregate data objects into one or more intermediate data objects. In various embodiments, the intermediate data objects may have various designated or predetermined time ranges that may be identified based on associated temporal data categories, such as a day, week, month, or year. Thus, intermediate data object generator 308 may be configured to perform an additional processing operation on the performance data that may include the aggregated data objects into larger data structures, such as the intermediate data objects, based on one or more characteristics or features of the aggregated data objects, such as a timestamp. As will be discussed in greater detail below with reference to FIG. 8, the aggregate data objects may be partitioned or grouped into various intermediate data objects having varying granularities of time ranges.

In various embodiments, data analyzer 305 may also include performance data object generator 310 which may be configured to generate performance data objects that identify or include performance data for a particular time range. Accordingly, performance data object generator 310 may be configured to generate a data object that includes performance data over a particular time range which may have been previously specified by an advertiser or may be specified by a default value or configuration. Accordingly, a performance data object may include sufficient data to support an analysis of the performance of an advertisement campaign over a time range that may be requested by an advertiser. As will be discussed in greater detail below with reference to FIG. 8, a performance data object may be assembled or generated based on a combination of several intermediate data objects.

In various embodiments, performance data analyzer 300 or any of its respective components may be include one or more processing devices configured to process performance data associated with advertisement campaigns. In some embodiments, performance data analyzer 300 may include one or more communications interfaces configured to communicatively couple performance data analyzer 300 to other components and entities, such as a data storage system and a record synchronizer. Furthermore, as similarly stated above, performance data analyzer 300 may include one or more processing devices specifically configured to process performance data associated with data events and advertisement campaigns. In one example, performance data analyzer 300 includes at least one query node and a plurality of big data processing nodes for processing large amounts of performance data in a distributed manner. For example, performance data analyzer 300 may include one or more query nodes to handle queries associated with a data storage system, and further configured to implement one or more components of a query system, as similarly discussed in greater detail below. Moreover, data analyzer 300 may further include several processing nodes, configured to handle processing operations on large data sets. Any suitable number of nodes may be included in performance data analyzer 300. Accordingly, performance data analyzer 300 may include one or more processing nodes configured to implement one or more components of a data aggregator, an intermediate data object generator, and/or a performance data object generator. For example, performance data analyzer 300 may include a first processing node, a second processing node, a third processing node, a fourth processing node, a fifth processing node, and/or a sixth processing node. In one example, data aggregator 306 may include a big data processing nodes for processing large amounts of performance data in a distributed manner. In one specific embodiment, performance data analyzer 300 may include one or more application specific processors implemented in application specific integrated circuits (ASICs) that may be specifically configured to process large amounts of data in complex data sets, as may be found in the context referred to as "big data."

In some embodiments, the one or more processors may be implemented in one or more reprogrammable logic devices, such as a field-programmable gate array (FPGAs), which may also be similarly configured. According to various embodiments, performance data analyzer 300 may include one or more dedicated processing units that include one or more hardware accelerators configured to perform pipelined data processing operations. For example, as discussed in greater detail below, operations associated with the generation of intermediate and performance data objects may be processed, at least in part, by one or more hardware accelerators included in intermediate data object generator 308 and performance data object generator 310.

In various embodiments, such large data processing contexts may involve performance data stored across multiple servers implementing one or more redundancy mechanisms configured to provide fault tolerance for the performance data. In some embodiments, a MapReduce-based framework or model may be implemented to analyze and process the large data sets disclosed herein. Furthermore, various embodiments disclosed herein may also utilize other frameworks, such as .NET or grid computing.

Figure 4:
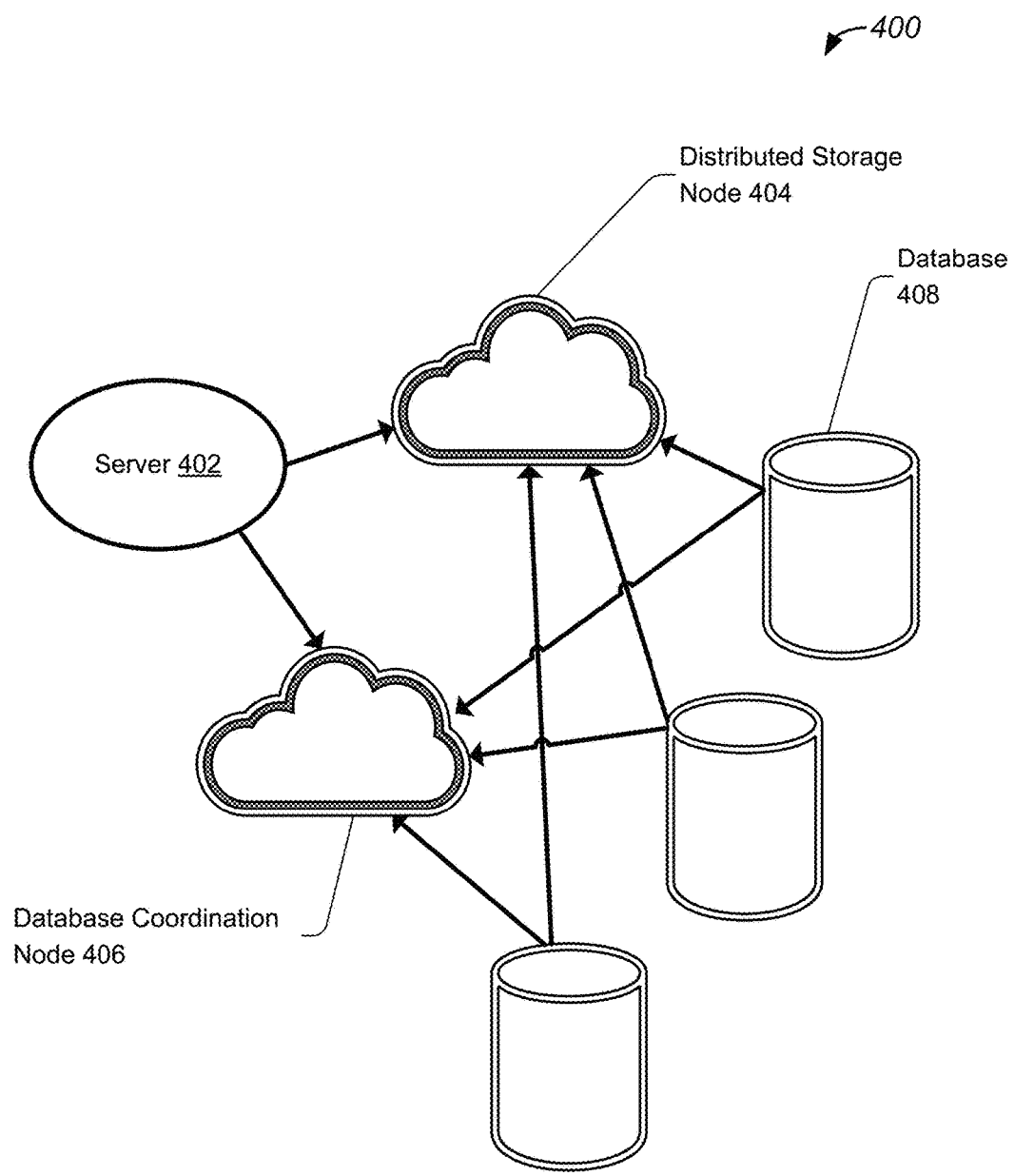
FIG. 4 illustrates a diagram of an example of a system for loading data into a distributed database, implemented in accordance with some embodiments.

FIG. 4 illustrates a diagram of an example of a system for loading data into a distributed database, implemented in accordance with some embodiments. In various embodiments, a system, such as system 400, may be implemented to load data, such as cache data generated by a performance data object generator, into a data storage system, which may be a distributed file system. In various embodiments, system 400 may be implemented as a combination of a distributed database coordination system and a relational database management system.

Accordingly, system 400 may include server 402 which may be configured to be a job initiator that may submit a computation job to another system component, such as distributed storage node 404. In some embodiments, distributed storage node 404 may be implemented as part of a Hadoop cluster. In various embodiments, the computation job may be a cache computation that may generate one or more performance data objects, as discussed in greater detail below with reference to FIG. 8. Once the computation job has finished, another system component, such as database coordination node 406, may receive metadata associated with the computation job. In response to the updating of the metadata, another system component, such as database 408 may load the newly computed data objects and delete any old ones that have been replaced. In various embodiments, the data may be partitioned or sharded before being stored in one or more databases, such as database 408. Accordingly, different shards may be assigned to different instances of databases. In some embodiments, database 408 may include a Java Virtual Machine (JVM) layer that may be communicatively coupled to database coordination node 406 and is notified of any directory changes in database coordination node 406. Moreover, database 408 may include a relational database management system (RDBMS) that may be configured to store performance data.

Figure 5:
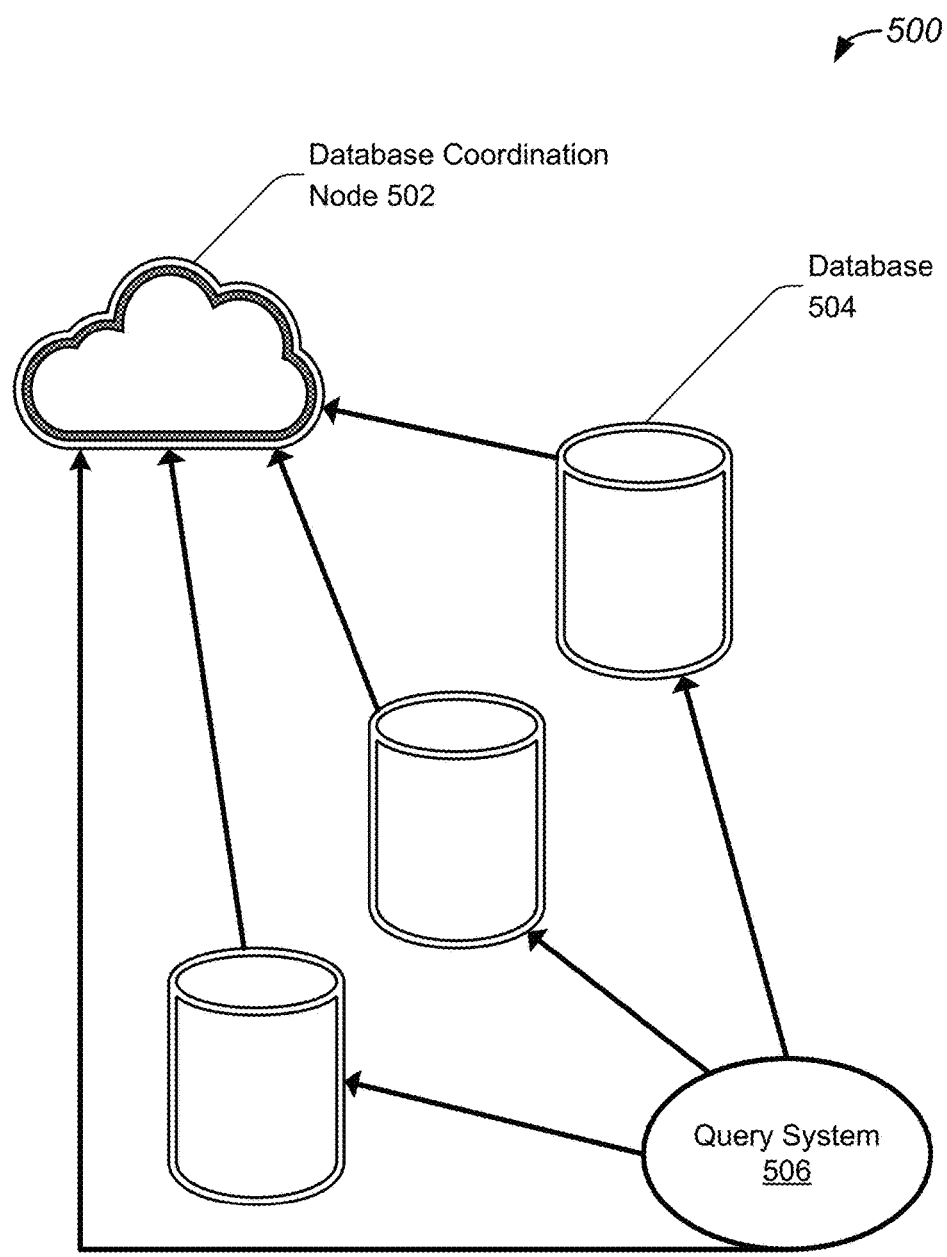
FIG. 5 illustrates a diagram of an example of a system for querying a distributed database, implemented in accordance with some embodiments.

FIG. 5 illustrates a diagram of an example of a system for querying a distributed database, implemented in accordance with some embodiments. A system, such as system 500, may be implemented to query data, such as cache data generated by a performance data object generator, from a data storage system, which may be a distributed file system. As similarly discussed above with reference to FIG. 4, system 500 may include database coordination node 502 and database 504. In various embodiments, system 500 may further include a query system, such as query system 506, which may be configured to receive and execute a query of performance data stored among distributed databases within system 500, such as database 504. In some embodiments, such a query may be generated by an API in response to receiving a request from an entity, such as an advertiser. Accordingly, query system 506 may be configured to fetch metadata and identify one or more storage locations, such as database tables, that may be utilized to return a result of the query.

Depending on the query, query system 506 may fetch data from one or multiple database instances. In various embodiments, query system 506 may return the result of the query, or may be configured to merge the results of the query into a single data object. For example, a query may be received that includes a request for performance data associated with advertisements A, B, C for the past week as well as the past Monday. Query system 506 may be configured to determine a number of cached data objects, such as performance data objects, that may be retrieved to complete the query. In this example, query system 506 may determine that two advertiser-specific cached performance data objects should be retrieved, one for the past week's weekly cache and one for Monday's daily cache. Query system 506 may analyze a partitioning or sharding strategy associated with the data objects. In this example, the strategy may indicate that A and C may be stored in shard 3 and B may be stored on shard 1. If shard 3 and shard 1 are implemented on the same database instance, query system 506 may issue one query to query tables for both shard 1 and shard 3 to return the requested results. If the shards are implemented on different instances, query system 506 may issue a query to two different database instances, and the results may be merged prior to being returned as a result of the original query. In some embodiments, query system 506 may be implemented as a query system, discussed in greater detail below with reference to FIG. 6.

Figure 6:
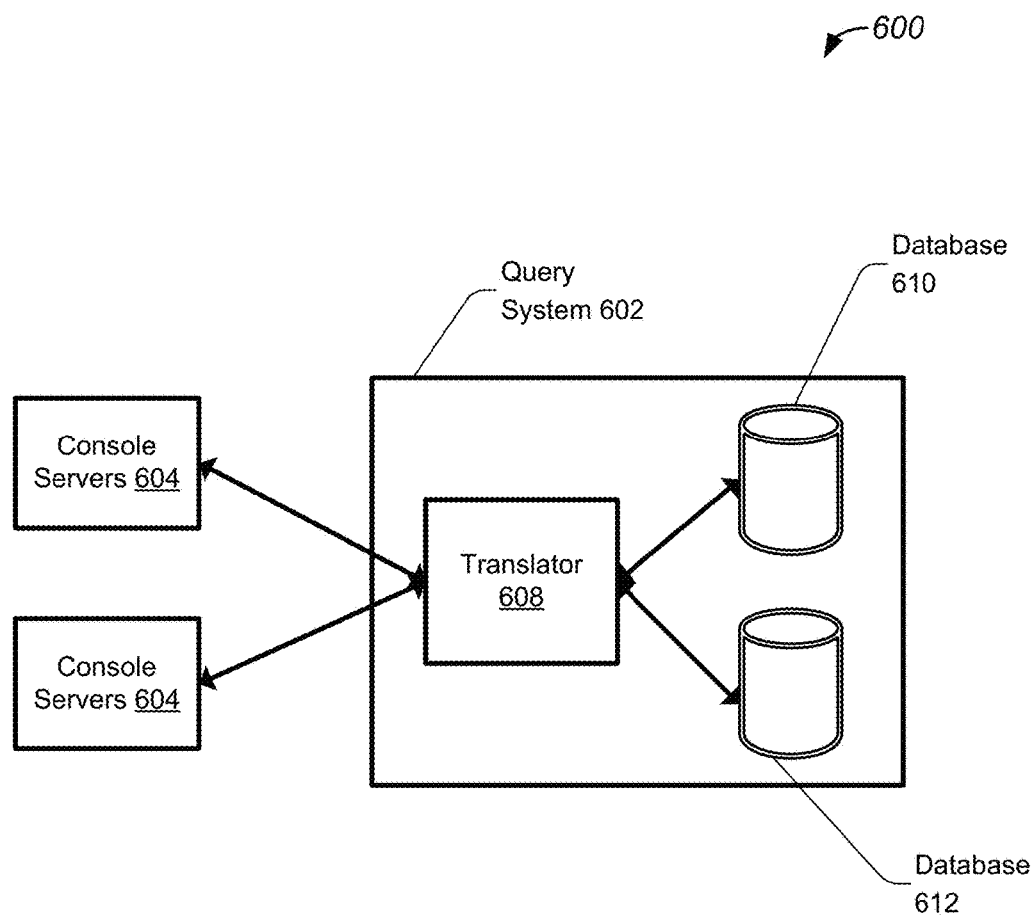
FIG. 6 illustrates a diagram of an example of a query system, implemented in accordance with some embodiments.

FIG. 6 illustrates a diagram of an example of a query system, implemented in accordance with some embodiments. A query system, such as query system 602, may be configured to, among other things, handle query requests which may be made by an advertiser, and retrieve one or more performance data objects that may have been previously cached to return a result for a query request. Furthermore, query system 602 may be configured to transform or translate queries received from an application that may be run by a client machine or console server, such as console servers 604 and 606, into queries that may be executed upon database systems, such as database 610 and database 612.

As similarly discussed above, console servers, such as console servers 604 and 606, may execute applications and/or provide online advertisement campaign services, such as those provided by Turn® Inc., to one or more entities, such as advertisers. For example, an advertiser may manage the implementation of its advertisement campaigns and be provided with an analysis of associated performance data via one or more services provided via an API that may be executed by console servers 604 and 606. In some embodiments, requests generated by console servers 604 and 606 may be sent as messages having a particular format specific to the online advertisement campaign service provider associated with console servers 604 and 606.

Accordingly, query system 602 may include translator 608 which may be configured to transform or translate the server requests into a format that may be processed or handled by a database system. For example, translator 608 may translate the requests into SQL statements. Accordingly, the translated requests may be executed by different databases, such as database 610 and database 612. In various embodiments, the processing of the requests may be performed with a relatively small latency, and a response time perceived at the console servers may be a few milliseconds. As will be discussed in greater detail below with reference to FIG. 8, in response to receiving a request for performance data, query system 602 may query time series data included in intermediate data objects as well as cached performance data objects to identify and retrieve one or more data objects that satisfy the query. If a single data object satisfies the query, it may be retrieved immediately. As discussed in greater detail below, if a single data object does not satisfy the query, query system 602 may be configured to identify several data objects that collectively satisfy the query.

In various embodiments, a query executed by query system 602 may be executed across multiple instances of databases in a distributed data storage system. For example, performance data and associated data objects may be stored across numerous different instances of databases to balance processing loads on the respective databases and ensure load and access times remain fast. Furthermore, additional processing of the data may be performed to further decrease response times and decrease a number of instances that is queried to retrieve data. In some embodiments, data may be replicated and shared among several databases to make the data available if only one database is queried. For example, query requests may often include a time period or interval that is less than three months. Accordingly, if daily performance data is stored in monthly data tables then up to four different instances may be queried to retrieve the requested data. If such data is replicated and shared among databases, then the number of instances queried may be reduced.

In some embodiments, the replication of data may be determined, at least in part, based on a replication factor which may identify or indicate an amount of data that should be replicated. Among other things, the replication factor may be a function of available space in a distributed storage system. If there is ample space in the storage system and the data to be replicated, such as performance data objects, is relatively small, the data may be replicated across all instances of databases within the storage system. However, if there is not enough space, query system 602 may be configured to manage the replication of the data such that some free space is left available in the storage system. For example, a single copy of data to be replicated may utilize space $S_c$. Moreover, a total amount of space available in a distributed storage system may be $T_s$, a replication factor may be $R_f$, and a free space percentage limitation may be $F_l$. In some embodiments, the free space percentage limitation may be about 20%. Accordingly, an replication factor appropriate for the free space percentage limitation may be determined based on equations 1 and 2 shown below:

$$S_c \times R_f / T_s \le 1 - F_l \tag{1}$$

$$R_f \le (1 - F_l) \times \frac{T_s}{S_c} \tag{2}$$

In various embodiments, query system 602 may be further configured to determine how replicated data is distributed. In one example, a number of all available instances may be $N_I$. Accordingly, if $R_f = N_I$, then the replication factor may be the number of all available instances, and data may be replicated across all instances. However, if $R_f = 1$, then the replication factor may be 1 and data may be distributed based on available space in the system. Such information identifying free space may be maintained by a system component, such a database coordination node. In this example, newly generated data objects to be replicated may be distributed to the instance that has the most free space. If there are multiple instances that have the same amount of free space, one may be randomly selected. Moreover, if $1 < R_f < N_I$, then the distribution of data may depend upon a length of a continuous time interval in a query. For example, a longest continuous interval covers $N_T$ tables. To distribute a data table stored in a particular instance, metadata managed by the database coordination node may be analyzed to determine locations of previous tables within the continuous interval. For example, replication factor $R_f$ may have a value of 3, and there may be 40 instances or nodes such that $N_I = 40$. As similarly discussed above, query performance may be increased when more data objects or tables targeted by the query are stored in fewer different instances because network costs and server loads may be reduced. As discussed above, most queries executed may be within a particular time or data range. For example, 90% of queries may be for data within the past three months. As similarly discussed above, performance data may be arranged as time series in intermediate data objects. Accordingly, the performance data may be stored in, among other time periods, one month data objects. Thus, four intermediate data objects, and four data tables storing the intermediate data objects, may be sufficient to satisfy most queries. In this example, of a number of instances, $R_f$, that include previous data tables within the continuous time period, $p_r$, percentage may include a copy of a current data table. Copies of the current data table may be distributed to the other $R_f$ instances based on free space.

For example, if time series data is included in a month-based intermediate data object, it may be stored in a data object, record, or file having a naming system that first includes a year and subsequently includes a month based on a creation or collection date, such as 201406. As will be discussed in greater detail below, for other data objects having different time-based granularities, additional information, such as a day, may also be included in the name. It may be determined that the data object should be distributed, and metadata may be retrieved from a database coordination node to determine the locations of data object 201406. A previous data object having a date range for the previous month, such as data object 201405, may have $R_f$ copies located in $R_f$ instances. Among these $R_f$ instances, $p_r$ percentage may be stored in the same instance as data object 201406. Accordingly, data object 201406 has been distributed on $R_f \times p_r$ instances, and $R_f \times p_r$ copies have been distributed. The rest of the copies to be distributed by data replication may be represented by $R_f-R_f \times P_r$, and may be distributed based on available free space. Subsequently, a data object for the next month, such as data object 201407 may be distributed. Accordingly, $p_r$ percentage of data object 201406 copies may be stored in the same instance as data object 201407. Thus, $R_f \times p_r \times p_r = R_f \times p_r^2$, and the instance may store data objects 201405, 201406, and 201407. Further still, another data object, such as 201408, may be distributed. As discussed above, $p_r$ percentage of data object 201407 copies may be stored in the same instance as data object 201408. Accordingly, $R_f \times p_r^3$ instances include data objects 201405, 201406, 201407, and 201408. As discussed above, for an interval of three months, at most four data tables may be queried. Accordingly, an expectation that an instance includes all data tables may be determined based on equations 3 and 4 shown below:

$$R_f \times p_r^{N_t-1} > 1 \tag{3}$$

$$p_r = {}^{N_t-1}\sqrt{\frac{1}{R_f}} \tag{4}$$

If $R_f \times p_r^3 > 1$, at most one instance includes data objects 201405, 201406, 201407, and 201408. Accordingly, that one instance may be identified based on available metadata and queried. Similar to an example above, if $R_f = 3$, then $p_r$ may be 69.3%.

In some embodiments, query system 602 or another system component may be configured to migrate data to consolidate the storage of time series data that may be stored in intermediate data objects as well as performance data objects that may be cached. As similarly discussed below, a unit of time series data may be daily, weekly, and/or monthly. In some embodiments, queries for performance data may not exactly coincide with the units of the time series. For example, a query for data collected within the past month may be retrieved from a monthly performance data object or intermediate data object. Accordingly, such data may be stored in a single data table. However, if queries are for two months, the queries may access two different tables. Because additional database table accesses may reduce performance, the data may be processed to reorganize the data and reduce database table accesses.

In one example, a database table may store one month of performance data. In this example, queries may be received from an entity, such as an advertiser, for 3 months of data and may call for accesses to 3 tables. More specifically, if data objects storing data for different months are stored in different tables, are labeled 201405, 201406, and 201407, and are stored in a single instance, a system component, such as query system 602, may be configured to combine or merge the data objects together to generate a larger table which may be labeled 20140567. The newly generated table may include all the data for 201405, 201406, and 201407. Because the data is now stored in a single table, the database performance may be improved. If 201405, 201406, and 201407 are located in two different instances, such as 201405 and 201406 being stored in a first instance and 201407 being stored in a second instance, 201407 may be migrated to the first instance, and the data may be combined. In various embodiments, the reorganization of data may be performed, at least in part, dynamically. Thus, a time period over which data objects should be combined may be determined dynamically, and based on advertiser activity. Returning to a previous example, the time period of 3 months that included 201405, 201406, and 201407 may have been determined based on a large frequency of 3 month requests issued by an advertiser.

In various embodiments, query system 602 may be configured to identify and select combinations of data objects which may be stored in the same instance of a database. Preferably selecting combinations stored in the same instance may minimize queries to multiple instances and reduce processing times. For example, once query system 602 has identified a combination of data objects that satisfies a query, query system 602 may determine whether or not the combination is located in a single instance. If the combination is located in the same instance, that combination may be selected. If the combination is not located in the same instance, query system 602 may identify a combination of data objects that is stored across the fewest instances, and may select that combination, and query system 602 may retrieve the data objects from the different instances. In this way data may be retrieved from multiple tables within a database, and from multiple instances of the databases themselves.

Figure 7:
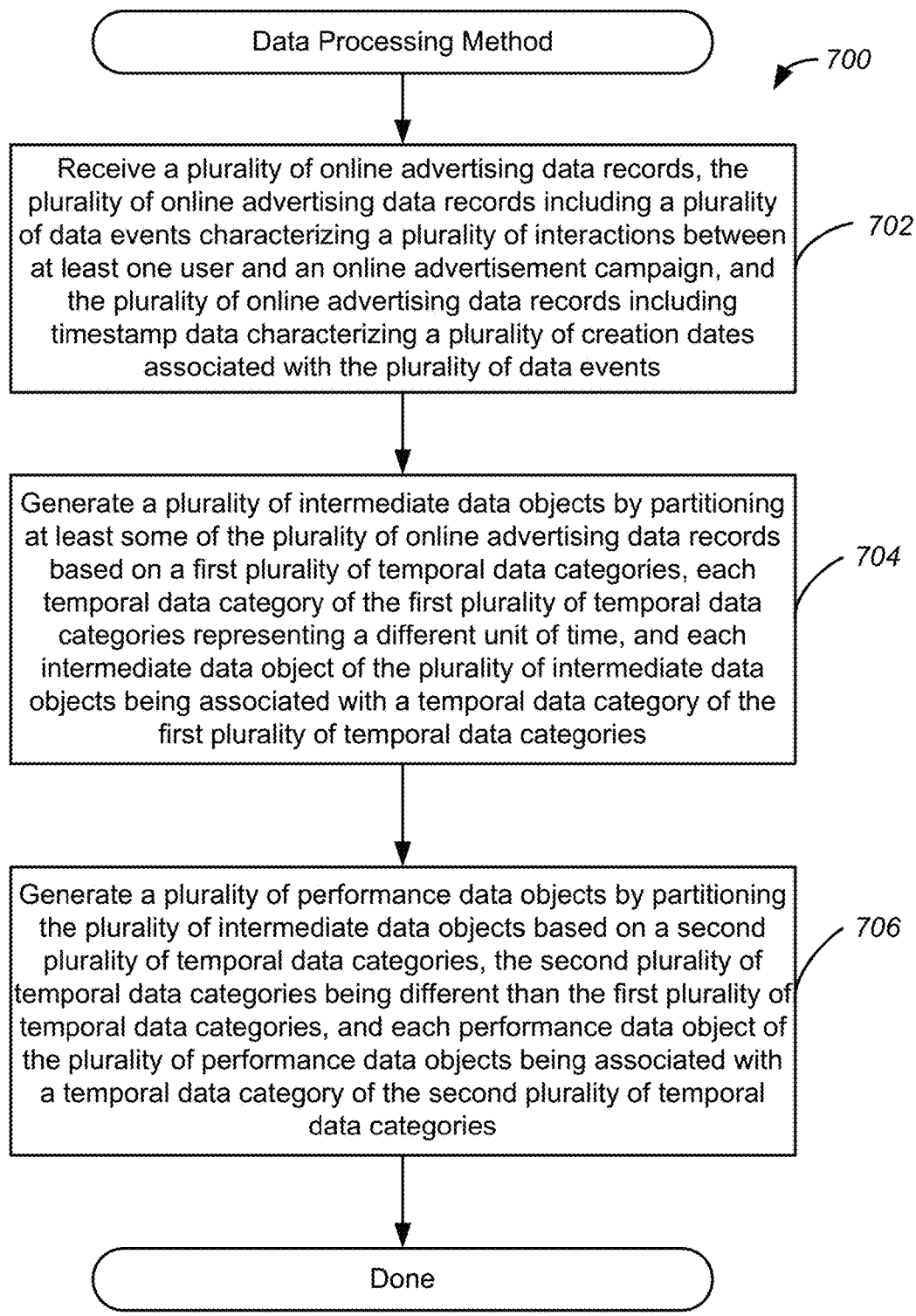
FIG. 7 illustrates a flow chart of an example of a data processing method, implemented in accordance with some embodiments.

FIG. 7 illustrates a flow chart of an example of a data processing method, implemented in accordance with some embodiments. A data processing method, such as method 700, may be used to implement a time-series based pipelined processing of performance data associated with an advertisement campaign. As discussed above, performance data that has been stored and logged may occupy numerous terabytes of data which may be too great in quantity for conventional analysis techniques. Accordingly, a pipelined method may be implemented that may include several stages or layers in a data processing scheme. For example, an aggregation and/or time series stage may be implemented to perform an initial stage of processing on raw online advertisement data. The result may a series of intermediate data objects which may include sequential representations of the underlying data organized based on several time categories. An additional stage of processing may be implemented to generate performance data objects organized based on different time categories. The data objects may be stored and cached for subsequent analysis. As discussed in greater detail below, the time series pipelined methods disclosed herein enable the efficient generation of time series data, and the efficient querying of such data when an analysis of the underlying performance data is subsequently performed.

Accordingly, method 700 may commence with operation 702 during which online advertising data records may be received. In some embodiments, the online advertising data records include records and log files that represent data events related to an online advertisement campaign. Accordingly, the data events may characterize interactions, such as actions, clicks, and views, between a user and an online advertisement campaign. The data events may have associated metadata, such as timestamps, that identifies when the data was generated, created, and/or collected.

Method 700 may proceed to operation 704 during which the received online advertising data may be arranged or packaged into several other data objects. As similarly discussed above, operation 704 may be part of a time series based pipelined process. Thus, during operation 704, an initial stage of data processing may be implemented and several intermediate data objects may be generated by partitioning at least some of the online advertising data records into different data objects based on a first set of temporal data categories. In some embodiments, temporal data categories may be data categories that represent units of time, such as days, weeks, months, and years. Accordingly, the online advertising data may be aggregated into different data objects to generate or pre-compute several sequential representations or time series of the online advertisement data. As discussed above, the intermediate data objects may have different temporal data categories. Thus, different intermediate data objects may have different associated units of time and may represent different durations of time. In this way, the raw online advertising data may be packaged into sequential data objects of varying durations or lengths, as may be determined based on one or more designated or predetermined time periods or intervals. As will be discussed in greater detail below with reference to FIG. 8, the raw online advertising data may be processed or aggregated into aggregate data objects, and the intermediate data objects may be generated incrementally based on the aggregate data objects.

Method 700 may proceed to operation 706 during which several performance data objects may be generated by partitioning the intermediate data objects into different data objects based on a second set of temporal data categories. Accordingly, operation 706 may implement an additional stage of processing which further combines the online advertising data into additional sequential data objects that have a different set of temporal data categories than those discussed above with reference to the intermediate data objects. Accordingly, as will be discussed in greater detail below with reference to FIG. 8, the performance data objects may have a larger temporal duration than the intermediate data objects, and may have a duration or date range that is customized or targeted to an advertisement campaign and an analysis of the performance of the advertisement campaign. As discussed below, such performance data objects may be stored in a data storage system and cached such that the performance data objects are rapidly accessible when queried, and additional processing of the underlying data is not needed.

Figure 8:
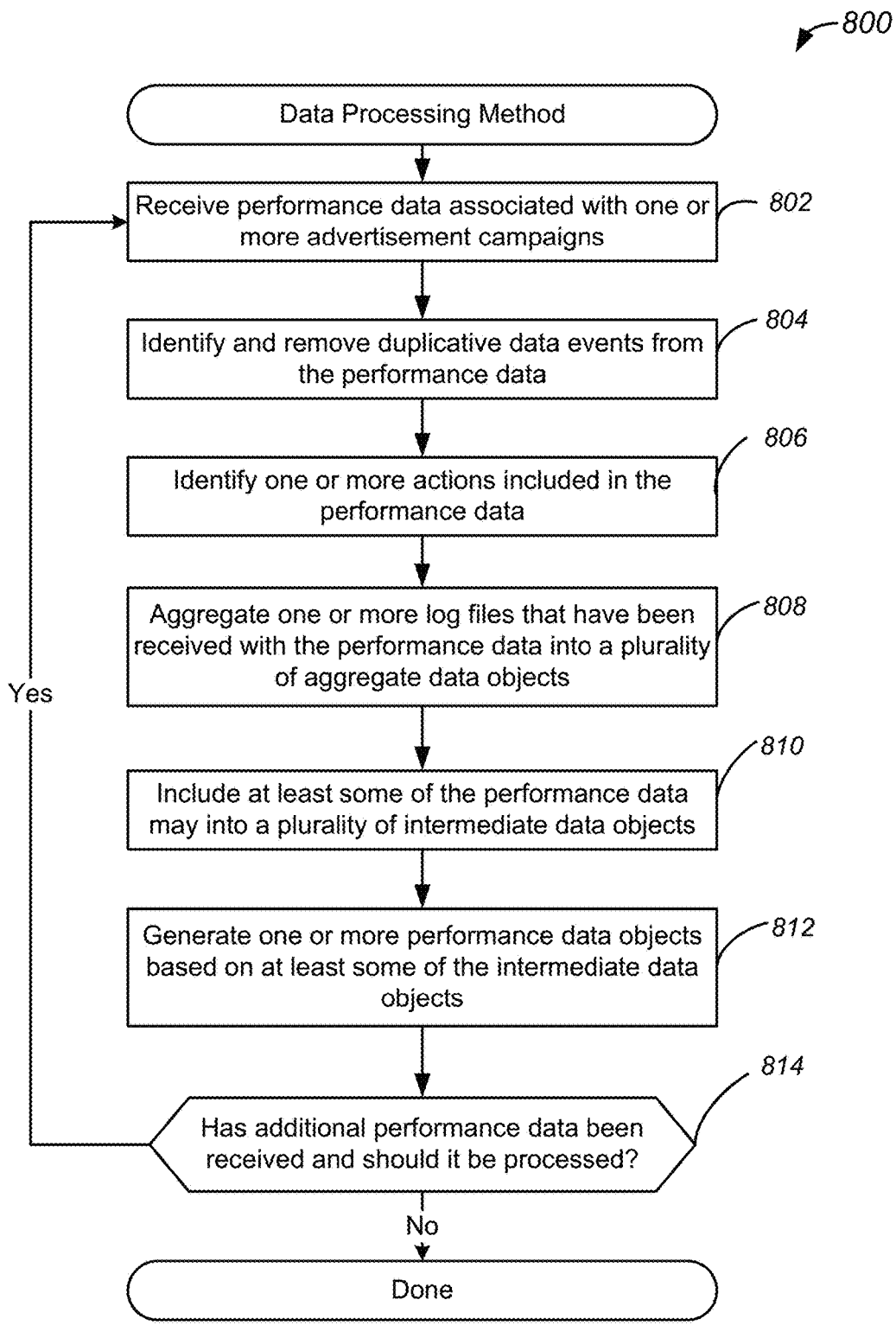
FIG. 8 illustrates a flow chart of an example of another data processing method, implemented in accordance with some embodiments.

FIG. 8 illustrates a flow chart of an example of another data processing method, implemented in accordance with some embodiments. As similarly discussed above, performance data may be processed to enable the quick and efficient execution of subsequent queries on such performance data. In various embodiments, the processing may include a time series based pipelined method, such as method 800, in which system components may process the data in different layers or stages to pre-compute one or more data objects that are arranged to represent time series information, and are stored and cached to be quickly accessible when a query is executed. As will be discussed in greater detail below, the time series based pipelined method may be an incremental method, thus reducing redundancies in an overall processing overhead which may be incurred.

Accordingly, method 800 may commence with operation 802 during which performance data associated with one or more advertisement campaigns may be received. As similarly discussed above, the performance data may include one or more data values identifying data events, which may be actions associated with advertisement campaigns. The performance data may be received from various data sources, such as browsers and servers used to implement the advertisement campaigns. The performance data may be received at one or more presentation servers and may be handled by a record synchronizer.

Method 800 may proceed to operation 804 during which duplicative data events may be identified and removed from the performance data. As similarly discussed above, a system component, such as a deduplication analyzer, may be configured to analyze the received performance data, identify duplicative data events or objects, and remove the duplicative data events. In some embodiments, the duplicative data events may be included in data objects such as log files which may be generated based on a user performing various actions, such as clicking on an advertisement, in response to being presented with that particular advertisement, as may occur during a decision making process that may include shopping and online commercial transactions of the user. Thus, multiple data events and associated log files may be included in the received performance data. The log files may include data values that identify the user, identify a type of data event, and further identify the advertisement associated with the data event. In various embodiments, the deduplication analyzer may identify the log files associated with the user and advertisement, and the deduplication analyzer may discard all duplicative data events to reduce the amount of data that is subsequently processed.

For example, the deduplication analyzer may implement a MapReduce job which may first read the received performance data. The performance data may include new log files identifying new data events, such as clicks. The received performance data may also include older data that may have been previously processed and deduplicated during a previous iteration of method 800. The deduplication analyzer may generate a plurality of advertisement-specific data objects by partitioning log files that identify a particular data event, such as a click, based on an advertisement identifier included in the log files. The deduplication analyzer may subsequently reduce or deduplicate the advertisement-specific data objects based on timestamp metadata associated with the log files as well as status data associated with the log files. In some embodiments, the status data may be one or more data values that include a flag or identifier that indicates whether or not a log file has been previously processed by method 800. For example, if all of the data events included in a particular advertisement-specific data object have been received from log files that are new and have not been previously processed, then the data event included in the log file that has the earliest timestamp may be retained, and the other data events may be discarded. In this way, the data included in the advertisement-specific data object may be reduced or deduplicated to a single data event. Furthermore, if the first data event in an advertisement-specific data object was included in a log file that has already been processed by method 800, then all subsequent data events may be discarded.

In various embodiments, deduplication may be optionally performed by deduplication analyzer, or may be performed by another component, such as a data aggregator. For example, all received performance data may be provided to the data aggregator and the data aggregator may filter the performance data based on an implementation of a MapReduce job.

Method 800 may proceed to operation 806 during which one or more actions included in the performance data may be identified. As similarly discussed above, a system component, such as a data event analyzer, may be configured to analyze the received performance data, and identify one or more actions included in the performance data based on a relationship between one or more data events and advertisements or impressions. As previously discussed, an action may be an event that identifies an activity or operation performed by an end user. For example, an end user may perform an action by clicking on an advertisement, viewing an advertisement, or performing a conversion, as may occur when purchasing a product. In this example, the end user may arrive at a webpage associated with the conversion at the conclusion of making a purchase. In some embodiments, the webpage may include a tracking pixel that may be configured to send a message to one or more servers, such as an advertisement server and/or presentation server, identifying the loading of the page and the purchase of the product. In response to receiving the message, the presentation server may generate a log file that identifies the data event that just occurred, which may be a beacon event.

In some embodiments, an action may be identified based on the data event by correlating the data event to an impression that occurred prior to the data event. For example, if the beacon event may be correlated with an advertisement that was previously presented to the end user, the data event may be identified as an action or the advertisement may be identified as a type of action, depending on one or more advertiser preferences. In various embodiments, a relationship between a data event and an impression may be determined based on one or more user history records that may be stored for each user identified by the system. A user history record may store a list or log of all impressions and data events associated with a particular user. Such a record may be stored and maintained for each of millions of users associated with the system used to implement method 800.

Accordingly, the log file associated with the data event being analyzed may include a user identifier that identifies the end user who performed the activity that generated the data event. The user identifier may be used to identify a particular user history record for that end user. In various embodiments, new log files that have not been previously processed may be partitioned based on user identifier. Each partition for a user may be merged with an existing user history record associated with that user. According to some embodiments, the contents of the merged list now included in the user history record may be analyzed to identify impressions that have been served to the user. In some embodiments, the clicks and impressions included in the user history record may be filtered based on an identifier associated with the data event. For example, a data event, such as a beacon event or fire, may include an identifier which may have been determined by an advertiser and associated with a particular advertisement campaign. Several clicks and/or impressions included in the user history record may be identified based on the identifier. In some embodiments, the most recent click or most recent impression may be identified as a click view based action or a view based action.

In various embodiments, operation 806 may be performed subsequent to operation 804. In some embodiments, operation 806 may be performed in tandem with or prior to operation 804. Accordingly, operation 804 and operation 806 may be implemented independently of each other, and operation 804 and operation 806 may be executed concurrently upon receiving the performance data at operation 802.

Method 800 may proceed to operation 808 during which log files that have been received may be aggregated into a plurality of aggregate data objects. In some embodiments, the log files aggregated during operation 808 may have been previously processed in accordance with operations 804 and 806. Accordingly, previously received performance data may have been pre-processed to eliminate duplicative data events and accurately identify actions associated with the data events. In various embodiments, the log files associated with the data events may be aggregated into data objects which may be arranged or partitioned based on a characteristic or feature of the data events. Accordingly, the log files may be partitioned into aggregate data objects based on timestamps associated with the log files. For example, a MapReduce job may be implemented to generate aggregate data objects partitioned based on a collection day. In this example, the log files collected or received on a first date, such as Nov. 20, 2014, may be stored in a first aggregate data object, and log files collected or received on a second date, such as Nov. 21, 2014 may be stored in a second aggregated data object. As will be discussed in greater detail below, aggregate data objects may be generated by numerous iterations of method 800 which may occur many times over the course of a period of time, such as a day. Thus, numerous aggregate data objects may be stored in a folder that represents that period of time, which may be a day. Accordingly, each aggregate data object may include a list of data events and/or log files that were received or generated during the designated period of time associated with that aggregate data object, which may be a unit of time such as day. In various embodiments, the aggregate data objects may include identifiers as well at least some of the performance data. For example, an aggregate data object may include one or more identifiers that identify a particular item, such as an advertisement, in an advertisement campaign or sub-campaign. The aggregate data object may also include a collection or count measure which identifies a total number of clicks and/or impressions that occurred during a time period associated with the aggregate data object.

As discussed above, the aggregate data objects may be generated incrementally in successive iterations of method 800. For example, a first iteration may generate a first aggregate data object that includes or identifies a first set of data events associated with an advertisement campaign. A successive iteration may generate a second aggregate data object that may include or identify any data events that occurred after the generation of the first aggregate data object. Such data events may be identified based on queries of the received raw log files. In one example, both the first and second aggregate data objects may have been generated on the same day and may be stored in a folder that represents that day, and may be labeled accordingly with a folder name such as 20140301. In this example, the folder 20140301 may store several aggregate data objects that were generated by different iterations of method 800 that occurred on Mar. 1,2014, where each aggregate data object represents relevant data events that occurred since a previous iteration of method 800.

As discussed above, the aggregate data objects may be stored in a folder of a data storage system and/or database system. Thus, a data folder may be generated that includes aggregate data objects generated for log files associated with a designated period of time. For example, a data folder may be generated for a date of Oct. 10,2014 and may include all aggregate data objects that have been generated for log files collected during that day. In various embodiments, the aggregation of the data may be performed at any date relative to the collection dates of the log files. For example, log files received on Nov. 21, 2014 may be aggregated and stored in an aggregate data object for that particular date during an aggregation operation that has been implemented on a subsequent date, such as Nov. 24, 1014. While various examples above have been described with reference to a unit of time that is a day, any suitable unit of time may be used, such as a week or month. Moreover, aggregate data objects may be generated in batches. For example, aggregate data object may be generated for each day over a designated period of time, which may be the previous three months. In this way, the performance data may be processed to generate several aggregate data objects.

Method 800 may proceed to operation 810 during which at least some of the performance data may be included in a plurality of intermediate data objects. In various embodiments, the aggregate data objects generated during operation 808 may be further processed to generate one or more intermediate data objects. As previously discussed, the aggregate data objects may be generated by aggregating raw log files into data objects based on a particular characteristic or feature, such as collection or generation date. In various embodiments, such an aggregation operation may be performed numerous times within a designated time period. Accordingly, a folder associated with a particular date, such as Oct. 15, 2014, may store several different aggregate data objects generated by different iterations of aggregation operations.

In various embodiments, a system component, such as an intermediate data object analyzer, may be configured to generate one or more intermediate data objects by merging one or more aggregate data objects. In some embodiments, the intermediate data objects may be sequential data objects that are configured to store the previously processed performance data in data objects that provide different sequential or temporal views of the performance data. As will be discussed in greater detail below, aggregate data objects may be merged into intermediate data objects having different features or characteristics. For example, intermediate data objects may be generated that include log files or one or more data values characterizing the log files that are organized or arranged by day, week, and/or month. Thus, the incremental representation of data events stored in the aggregate data objects may be merged into different intermediate data objects associated with different temporal data categories. It will be appreciated that the intermediate data objects may be generated based on any suitable unit of time. The intermediate data objects may be stored in a data storage system and/or database system. As similarly discussed above, the intermediate data objects may be stored in separate folders organized according to a unit of time. In this way, log files and associated data events may be iteratively processed and arranged into separate data objects based on one or more characteristics, such as a date of collection or generation. Moreover, as described herein, such arranging of the log files may be performed efficiently in a way that reduces redundancies in processing operations.

According to some embodiments, the intermediate data objects may be generated incrementally. Thus, aggregate data objects and intermediate data objects generated based on previous iterations of method 800 may provide a basis for the generation of new or updated intermediate data objects. A system component, such as an intermediate data object generator, may be configured to scan previously stored intermediate data objects and to identify the most recently generated intermediate data object. In some embodiments, the intermediate data objects may be stored in a particular format. For example, the intermediate data objects may be stored in a folder that has the following format as a folder name: <time series type>/<collection date>/<time series type>_<collection date>_<creation date>.<iteration number>. The contents of the folder may be analyzed to identify the intermediate data object having the most recent creation date. Once identified, one or more aggregate data objects may be identified based on the creation date. For example, aggregate data objects having a creation dates that occurred later than the creation date of the intermediate data object may be identified. If there are multiple aggregate data objects with the same creation date, the aggregate data object having the largest or most recent iteration number may be selected. In this way, the most recent aggregate data object may be selected and combined with a previously generated intermediate data object to incrementally update the intermediate data objects.

For example, an intermediate data object may have been generated for a particular day and may be stored in a folder having a pathname of: Daily/140301/daily_140301_140531.385. In this example, a daily intermediate data object named "daily_140301_140531.385" may include aggregate data objects up until the creation of an aggregate data object named 140531 having a particular date represented by 140301. More specifically, the aggregate data object may include data from log files 140301/mr_140301.105, . . . 140301/mr_140531.385. If a new aggregate data object is subsequently generated, for example, in another iteration of method 800, a new file 140301/mr_140602.401 may be generated and associated with 140301. In this example, the new file may be retrieved as new incremental data. In some embodiments, if there are multiple aggregate data objects that have the same creation date, such as aggregate data objects named 140301/mr_140602.398 and 140301/mr_140602.401, the aggregate data object having the most recent iteration of method 800 may be selected. In this example, the aggregate data object 140301/mr_140602.401 may be selected because iteration number 401 is larger and more recent than 398. Thus, the new data of 140301 may be included with the previously generated data included in daily 140301_140531.385. In this way, the previously generated intermediate data object and its underlying data do not have to be recomputed, and processing operations may be reduced.

In various embodiments, intermediate data objects may be larger than aggregate data objects. For example, a size of an intermediate data object "daily_140301_140531.385" may be significantly larger than an aggregate data object "140301/mr_140602.401." Accordingly, aggregate data objects may be integrated or merged with intermediate data objects in batches. In some embodiments, a threshold value may determine when a batch merge should occur. For example, a batch merge may be initiated in response to a threshold value being met. In this example, the threshold value may be a designated number of aggregate data objects. For example, a batch merge may be initiated when more than 10 new aggregate data objects have been identified in accordance with the incremental process described above.

In some embodiments, a batch merge may be initiated in accordance with the following equations. For example, as shown in equation 5 below:

$$\text{Cost}(k) = \text{Merge}_{cost} + \text{Query}_{cost} + \text{LeftOver}_{cost} \quad (5)$$

In this example, Cost may be an estimated cost score associated with a variable k. $\text{Merge}_{cost}$ may be a cost score if a merge has been triggered. $\text{Query}_{cost}$ may be a cost score associated with accessing merged intermediate data objects. $\text{LeftOver}_{cost}$ may be a cost score associated with accessing aggregate data objects. Accordingly, equation 5 may be implemented to provide an approximation of an overall cost incurred. As discussed in greater detail below, such an expression of cost may be used to estimate the merging boundary k. As previously discussed, the aggregate data object having the most recent creation or collection data may be selected. Accordingly, for the past D dates of data, D/k merges may be initiated. In some embodiments, a weight $w_m$ may be generated and assigned to each merge. Accordingly, an estimate $\text{Merge}_{cost}$ may be determined by equation 6 shown below:

$$\text{Merge}_{cost} = w_m D/k \quad (6)$$

In some embodiments, the most recent intermediate data objects may be accessed more often or frequently than older ones. For example, a frequency of accesses may be linearly and inversely proportional to an amount of time from the present execution of method 800. Accordingly, a weight $w_q$ may be generated based on such a relationship. Thus, an access cost incurred when accessing a current intermediate data object may be $w_q D$, whereas an access cost incurred when accessing an intermediate data object generated previously may be $w_q(D-1)$, and for D days ago may be $w_q$. Accordingly, a total access cost may be determined based on equation 7 shown below:

$$\text{Query}_{cost} = w_q D + w_q(D-1) + \ldots w_q = w_q(D+1)D/2 \quad (7)$$

In some embodiments, there may be one or more aggregate data objects that have not yet been merged. In various embodiments, an expect number of leftover aggregate data objects may be determined based on equation 8 shown below:

$$E_{num} = \frac{(k-1)}{2} \quad (8)$$

As similarly discussed above, an access frequency associated with these aggregate data objects may be inversely and linearly proportional to an amount of time from the current execution of method 800. Accordingly, a weight $w_o$ may be generated for aggregate data objects, and a cost for accessing aggregate data objects may be determined based on equation 9 and equation 10 shown below:

$$LeftOver_{cost} = w_o(w_q(D+1)D/2)E_{num} = w_o w_q(D+1)D(k-1)/4 \quad (9)$$

$$\text{MinCost} = \frac{w_m D}{k} + \frac{w_q(D+1)D}{2} + \frac{w_o w_q(D+1)D(k-1)}{4} \quad (10)$$

In various embodiments, an approximation of cost may be determined based on equation 11 shown below:

$$\frac{d(\text{MinCost})}{dk} = 0 \quad (11)$$

Accordingly, the variable k which may represent a threshold number of new aggregate data objects that should be present to trigger a batch merger may be determined based on equation 12 shown below:

$$k = 2\sqrt{\frac{w_m}{w_0 w_q(D+1)}} \quad (12)$$

As shown in equation 12, if the merge weight $w_m$ is high, k may be increased to reduce a total cost incurred by the batch merge operation. If the accessing cost weight is high, k may be decreased to trigger a batch merge more frequently, and to decrease or reduce the total cost incurred by the batch merge operation. As similarly discussed above, weights may be determined based on one or more usage statistics associated with the system. For example, data objects having larger sizes may be assigned a higher weight, such as a relatively large $w_q$. Moreover, data objects having date ranges that are accessed frequently may be assigned higher weights, such as a relatively large $w_m$. Similarly, data objects having smaller sizes or date ranges that are accessed less frequently may be assigned lower weights such as a relatively small $w_q$ and $w_m$ respectively.

In some embodiments, the generation of the intermediate data objects may be configured based on one or more entity-specific parameters. In various embodiments, an entity-specific parameter may be an advertiser-specific parameter. For example, the advertiser-specific parameter may be a time zone associated with the advertiser. In this example, an advertiser may be located in a particular time zone and may access a database system via a console server also located in that time zone. As described above, performance data may be received and aggregated from multiple different time zones across the world. For example, performance data may be received from the Pacific time zone as well as the Eastern time zone. As will be described in greater detail below, the intermediate data objects may be generated based, at least in part, on the advertiser time zone and may be configured specifically for the advertiser time zone. In particular embodiments, the entity-specific parameter may be a user-specific parameter. Accordingly, the user-specific parameter may be a time zone associated with a user who may be an online customer, and the intermediate data objects may be generated based, at least in part, on the user time zone and may be configured specifically for the user time zone.

In various embodiments, a default time zone may be selected. For example, a default time zone may be determined to be the Eastern time zone of the United States. In this example, all data aggregated and stored during operation 808 may be converted to the default time zone. Intermediate data objects generated based on the aggregated data may also be generated in accordance with the default time zone. The intermediate data objects may be converted to a target time zone upon storage in a data storage system and/or database system. For example, the target time zone may be a time zone associated with a user or advertiser. Alternatively, the intermediate data objects may be generated in accordance with the target time zone and subsequently stored with no additional conversion.

In various embodiments, the conversion of log files to the default time zone may be performed by analyzing one or more data values included in the log file that identify the timestamp and a native time zone associated with the log file. Moreover, additional performance data may be identified based on the native time zone and time stamp of a particular log file. For example, if performance data is retrieved from a first time zone, a corresponding date in a potential target time zone will be within one day before or after the timestamp of the log file. Accordingly, to compute daily data D for a target time zone, performance data from D−1, D, and D+1 as identified by the default time zone may be retrieved. An aggregation operation as described above with reference to operation 808 may be performed in response to receiving one or more data values identifying a particular date in a target time zone.

In some embodiments, the aggregate data objects may be configured to include at least two time zone data fields. A first time zone data field may be configured to store a default time zone key and a second data field may be configured to store a target time zone key. Accordingly, in response to identifying a customer time zone, target time zone keys/data may be generated based on the native or default time zone and time stamp of the aggregate data object and log files included in the aggregate data object. Thus, in response to receiving a request for performance data from a customer time zone, performance data identified by the standard time zone may be queried, target time zone keys may be calculated, and intermediate data objects customized for the target time zone may be generated. For example, to retrieve performance data for a date identified by 140302 in a customer time zone, performance data may be retrieved for 140301, 140302 and 140303 from a standard time zone folder, such as Daily/140301, Daily/140302, and Daily/140303. Based on the customer time zone, target time zone keys may be generated and used to generate an intermediate data object based on the retrieved performance data. Accordingly, the intermediate data object may be customized or targeted to the customer's time zone and may be labeled accordingly by having a file name such as CustomerDaily/140302.

Method 800 may proceed to operation 812 during which one or more performance data objects may be generated based on at least some of the intermediate data objects. In various embodiments, the performance data objects may include performance data for one or more predetermined or designated time or date ranges. As previously discussed, performance data may have been previously arranged into units of time of varying granularities. For example, the performance data may have been partitioned into intermediate data objects having associated time periods of days, weeks, or months. As will be discussed in greater detail below with reference to FIG. 9, performance data objects may be generated that have varying time or date granularities based on the previously generated intermediate data objects. For example, based on the previously generated intermediate data objects, a system component, such as a performance data object generator, may generate a performance data object that includes data events identified by a combination of intermediate data objects. In various embodiments, the intermediate data objects may be determined or identified such that the number of intermediate data objects included in the performance data object is reduced, and an amount of processing operations is also reduced.

Method 800 may proceed to operation 814 during which it may be determined whether or not additional performance data has been received and should be processed. Such a determination may be made based on one or more data values received from a system component, such as a presentation server. For example, a system component, such as a performance data analyzer, may be configured to detect the receiving of additional log files from one or more presentation servers, and may be configured to set or modify a flag or identifier in response to the detecting. One or more system components may initiate another iteration of method 800 based on the status of the flag or identifier. If it is determined that additional performance data has been received and should be processed, method 800 may return to operation 802. If it is determined that no additional data should be processed, method 800 may terminate.

Figure 9:
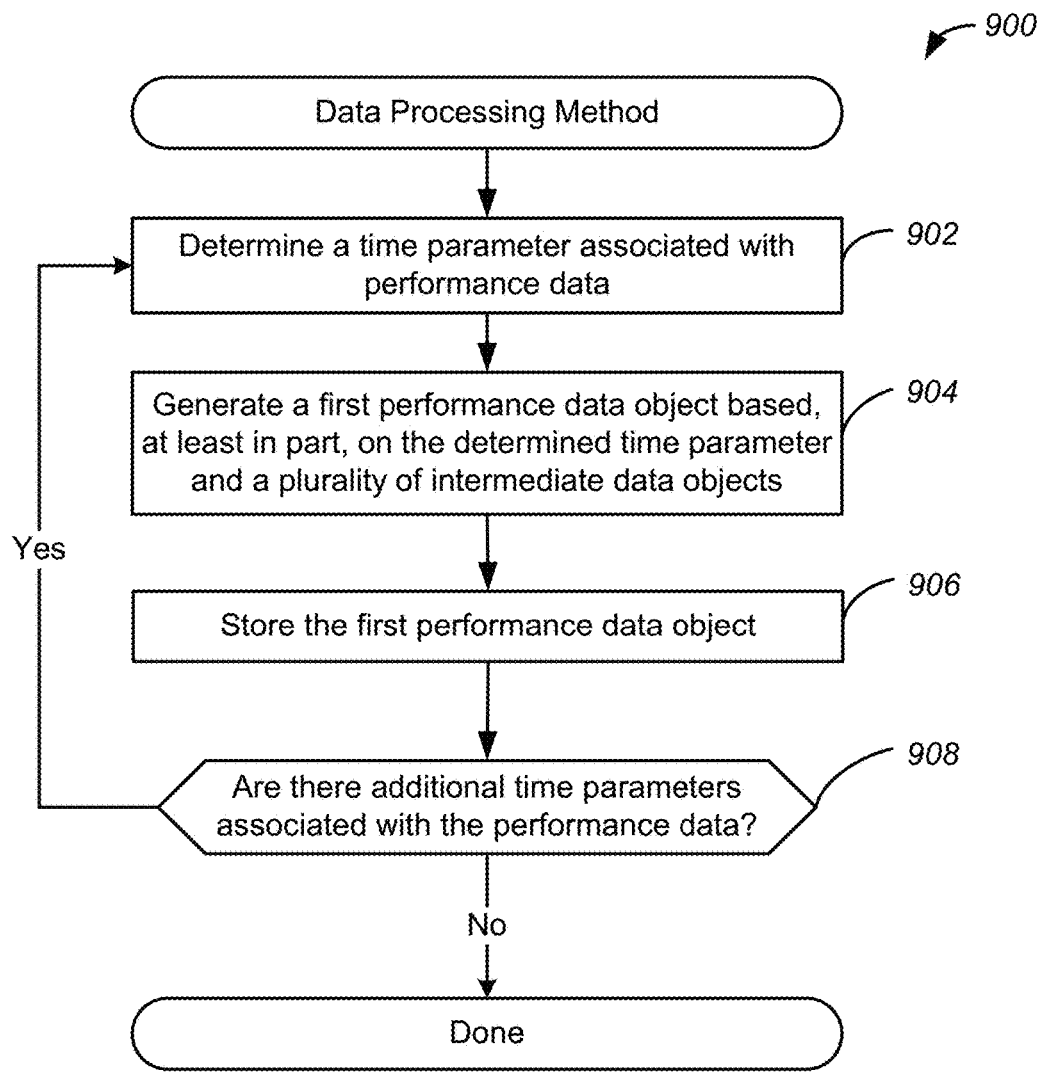
FIG. 9 illustrates a flow chart of an example of yet another data processing method, implemented in accordance with some embodiments.

FIG. 9 illustrates a flow chart of an example of yet another data processing method, implemented in accordance with some embodiments. As similarly discussed above, intermediate data objects may be sequential representations of performance data that has been partitioned or organized into discrete units of time, such as a day, week, month, and year. In various embodiments, the intermediate data objects may be further processed to generate performance data objects. In some embodiments, performance data objects may also be sequential representations of performance data. However, performance data objects may be generated for less uniform or custom periods of time. For example, a performance data object may be generated for a fraction of a week, a fraction of a month, a period of 90 days in the past, or a period of 16 months in the past. In such examples, such a date or time period may be determined based on an input that may have been previously received from an advertiser. Thus, one or more performance data objects may be generated and stored as cache data that may be quickly retrieved and utilized when requested by an advertiser.

Accordingly, method 900 may commence with operation 902 during which a designated time parameter may be determined. As similarly discussed above, a performance data object may have an associated time period or duration that defines its respective data range. Accordingly, the time period may be defined or characterized by a time parameter. In some embodiments, the time parameter may be a default value or may have been previously received from an entity, such as an advertiser. For example, an advertiser may provide or may have previously provided an input to a console server when initiating an analysis of performance data for an advertisement campaign that has been implemented by the advertiser. The input may specify a particular time frame that the advertiser intends to analyze. Accordingly, such a time frame may provide the basis of the generation of a performance data object. In various embodiments, the time frame may be one of several default or designated settings that automatically generates and provides a default set of performance data objects to the advertiser. As similarly discussed above, one or more endpoints of the time frame may be determined based on date and time of generation of the data object. For example, a data object having a date range of 16 months may have a first end point determined based on the generation date of the data object, and may also have a second end point determined by subtracting 16 months from the generation date.

Method 900 may proceed to operation 904 during which a first performance data object may be generated based on the determined time parameter. As similarly discussed above, a performance data object may be generated or populated based on a combination of previously generated intermediate data objects. In this way, a performance data object may be assembled from a combination of several intermediate data objects that have associated time periods smaller than the determined time parameter. The combination of intermediate data objects may be configured to reduce the overall number of records accessed, and reduce an overall processing time associated with method 900. In various embodiments, such combinations may be determined based on one or more shortest path techniques or breadth first searching techniques.

Accordingly, several candidate combinations of intermediate data objects may be analyzed to identify a particular combination that may be used to generate the performance data object. In some embodiments, all available intermediate data objects having data, such as log files, included within the time range specified by the time parameter may be retrieved for analysis. The retrieved intermediate data objects may be analyzed sequentially and based on their recency and the relative size of their time ranges. In one example, the time parameter may specify a target endpoint for a time period or range, such as 55 days in the past. A system component, such as a performance data object generator, may be configured to iteratively analyze and track endpoints of the time ranges associated with the retrieved intermediate data objects to assemble a collection of intermediate data objects that collectively includes a date or time range that reaches the target endpoint. In this example, a largest available intermediate data object may be selected and its endpoint may be used as the starting point of the next iteration of the assembly process. For example, the intermediate data object that was selected may have been for a month and may reach 30 days back. The next intermediate data object may be selected subsequently. Because a month is too large and would exceed the 55 day limit, an intermediate data object that has a time range of a week may be selected, thus starting at the 30 day ending point of the previous intermediate data object, and reaching 37 days back. Additional iterations may be performed two more times with two additional week-long intermediate data objects to reach 51 days back. At this point, a week may be too large, so an intermediate data object having a time range of one day may be selected, thus reaching back 52 days. The process may be repeated 3 more times to achieve a collection of performance data that spans the entire time period designated by the time parameter, which is 55 days in the past in this example. Accordingly, the intermediate data objects included in the performance data object would include 1 month-long intermediate data object, 3 week-long intermediate data objects, and 4 day-long intermediate data objects. In various embodiments, such an iterative assembly process may be implemented in a single instance or node of a data storage or database system. In some embodiments, if additional data objects are needed to satisfy the query and cannot be retrieved from a single instance, additional instances may be queried, as discussed in greater detail below.

Method 900 may proceed to operation 906 during which the first performance data object may be stored. As similarly discussed above, the first performance data object may be stored in a data storage system and/or database system. The first performance data object may be subsequently accessed by an entity, such as an advertiser, when performance data is queried by the advertiser. Thus, performance data objects may be computed, updated, and cached as part of an ongoing background process. The results of this background process may be provided to the advertiser as the result of a query when the advertiser subsequently performs or requests an analysis of the performance data. Having a cached copy of the data already available enables the request to be processed quickly and with a relatively small amount of processing overhead. Moreover, as similarly discussed above, the performance data objects may be generated based on a target time zone to provide customized time series to the advertiser.

Method 900 may proceed to operation 908 during which it may be determined whether or not there are additional time parameters. As similarly discussed above, additional performance data objects may be generated for different time parameters. For example, the first performance data object may have been generated based on a first time parameter having a first length of ten days. A second time parameter having a second length of 1.5 months and a third time parameter having a third length of 3 months may also exist. Accordingly, if it is determined that additional time parameters exist, method 900 may return to operation 902 and additional performance data objects may be generated. As discussed above, a component, such as a query server or system, may select various intermediate data objects and group them based on their respective data ranges, and include the selected intermediate data objects in a performance data object which may be stored in a data storage system. If it is determined that no additional time parameters exist, method 900 may terminate.

Figure 10:
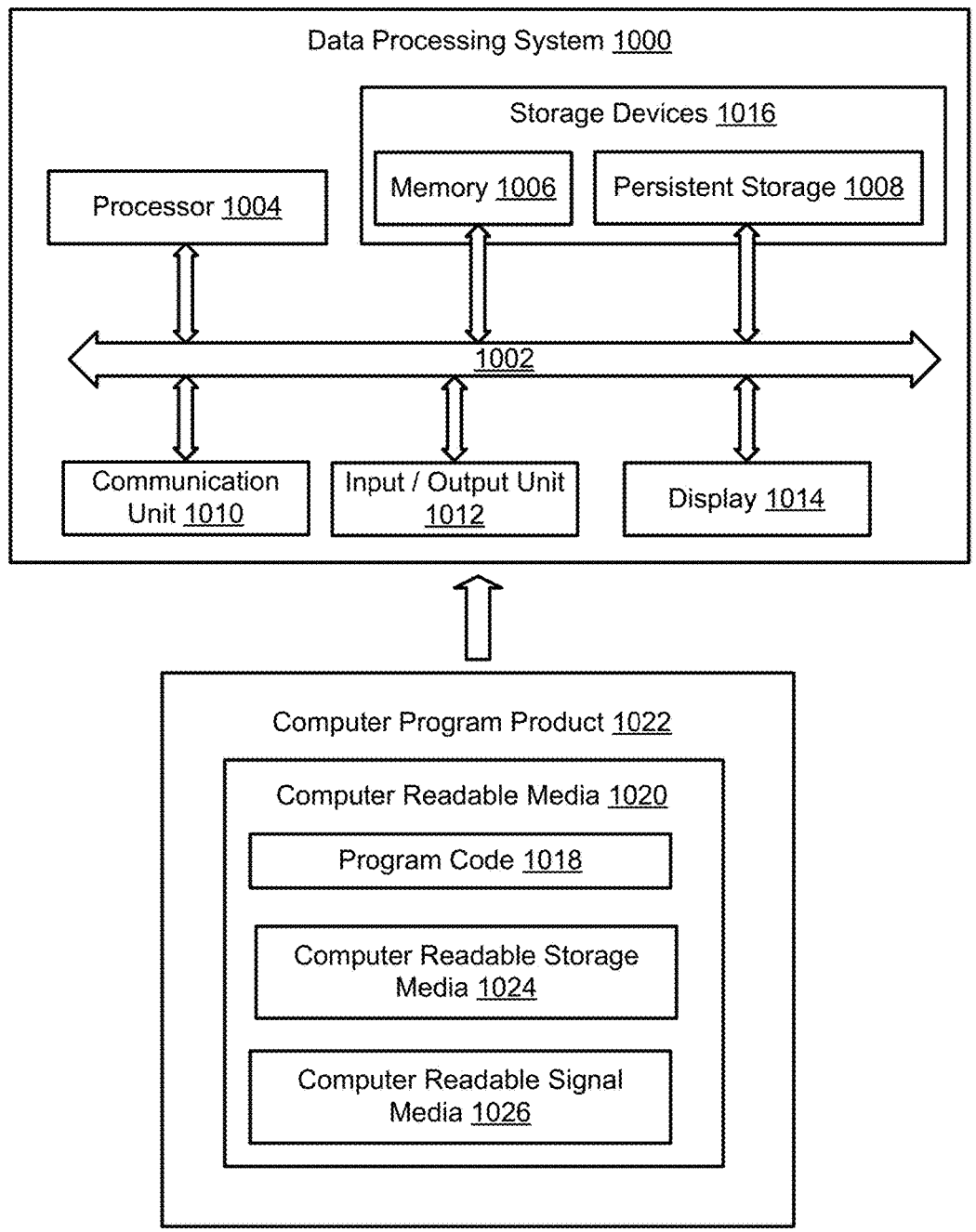
FIG. 10 illustrates a data processing system configured in accordance with some embodiments.

FIG. 10 illustrates a data processing system configured in accordance with some embodiments. Data processing system 1000, also referred to herein as a computer system, may be used to implement one or more computers or processing devices used in a controller, server, or other components of systems described above, such as a data analyzer. In some embodiments, data processing system 1000 includes communications framework 1002, which provides communications between processor unit 1004, memory 1006, persistent storage 1008, communications unit 1010, input/output (I/O) unit 1012, and display 1014. In this example, communications framework 1002 may take the form of a bus system.

Processor unit 1004 serves to execute instructions for software that may be loaded into memory 1006. Processor unit 1004 may be a number of processors, as may be included in a multi-processor core. In various embodiments, processor unit 1004 is specifically configured to process large amounts of data that may be involved when processing performance data associated with one or more advertisement campaigns, as discussed above. Thus, processor unit 1004 may be an application specific processor that may be implemented as one or more application specific integrated circuits (ASICs) within a processing system. Such specific configuration of processor unit 1004 may provide increased efficiency when processing the large amounts of data involved with the previously described systems, devices, and methods. Moreover, in some embodiments, processor unit 1004 may be include one or more reprogrammable logic devices, such as field-programmable gate arrays (FPGAs), that may be programmed or specifically configured to optimally perform the previously described processing operations in the context of large and complex data sets sometimes referred to as "big data."

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Storage devices 1016 may also be referred to as computer readable storage devices in these illustrative examples. Memory 1006, in these examples, may be, for example, a random access memory or any other suitable volatile or non-volatile storage device. Persistent storage 1008 may take various forms, depending on the particular implementation. For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these illustrative examples. In one example, computer readable media 1020 may be computer readable storage media 1024 or computer readable signal media 1026.

In these illustrative examples, computer readable storage media 1024 is a physical or tangible storage device used to store program code 1018 rather than a medium that propagates or transmits program code 1018.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1000 are not meant to provide architectural limitations to the manner in which different embodiments may be implemented. The different illustrative embodiments may be implemented in a data processing system including components in addition to and/or in place of those illustrated for data processing system 1000. Other components shown in FIG. 10 can be varied from the illustrative examples shown. The different embodiments may be implemented using any hardware device or system capable of running program code 1018.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A system comprising:
a first processing node comprising one or more processors configured to receive a plurality of online advertising data records, the plurality of online advertising data records including a plurality of data events characterizing a plurality of interactions between at least one user and an online advertisement campaign, and the plurality of online advertising data records including timestamp data characterizing a plurality of creation dates associated with the plurality of data events, wherein the first processing node is a first pipelined stage;
a second processing node comprising one or more processors configured to generate a plurality of intermediate data objects by partitioning at least some of the plurality of online advertising data records based on a first plurality of temporal data categories, each temporal data category of the first plurality of temporal data categories representing a different unit of time, and each intermediate data object of the plurality of intermediate data objects being associated with a temporal data category of the first plurality of temporal data categories, wherein the second processing node is a second pipelined stage configured to store the plurality of intermediate data objects in a data storage system that is queryable by a query system; and
a third processing node comprising one or more processors configured to generate a plurality of performance data objects by partitioning the plurality of intermediate data objects based on a second plurality of temporal data categories, the second plurality of temporal data categories being different than the first plurality of temporal data categories, and each performance data object of the plurality of performance data objects being associated with a temporal data category of the second plurality of temporal data categories, wherein the third processing node is a third pipelined stage configured to generate the plurality of performance data objects based on the plurality of intermediate data objects received from the second pipelined stage and store the plurality of performance data objects in the data storage system such that a query may be executed by the query system on both the plurality of intermediate data objects and the plurality of performance data objects.

2. The system of claim 1, wherein the first processing node is further configured to:
generate a plurality of aggregate data objects by partitioning the online advertising data records based on a third plurality of temporal data categories, the plurality of aggregate data objects being generated incrementally, and the generating of the plurality of aggregate data objects being responsive to receiving at least some of the plurality of online advertising data records.

3. The system of claim 2, wherein the plurality of intermediate data objects is generated based, at least in part, on the plurality of aggregate data objects.

4. The system of claim 1, wherein each intermediate data object of the plurality of intermediate data objects includes a sequential representation of at least one online advertising data record identified based on a temporal category of the first plurality of categories, and wherein the first plurality of temporal data categories includes at least one of a day, week, and month.

5. The system of claim 4, wherein at least one performance data object of the plurality of performance data objects is generated by combining two or more intermediate data objects, and wherein the plurality of intermediate data objects and the plurality of performance data objects are stored in a data storage system configured to process performance data queries.

6. The system of claim 5, wherein the query system further comprises a fourth processing node configured to:
receive a query request from an advertisement campaign management application program interface (API);
execute the query on the plurality of intermediate data objects and the plurality of performance data objects stored in the data storage system; and
generate a result object that includes a result of the query.

7. The system of claim 6, wherein result object includes a combination of at least one intermediate data object and at least one performance data object.

8. The system of claim 7, wherein the fourth processing node is configured to:
  identify the at least one intermediate data object and at least one performance data object included in the combination based, at least in part, on the first and second temporal data categories associated with the at least one intermediate data object and at least one performance data object; and
  include the at least one intermediate data object and at least one performance data object in the result object.

9. The system of claim 1 further comprising a fifth processing node configured to:
  identify a plurality of duplicative data events included in the plurality of online advertising data records; and
  remove the plurality of duplicative data events from the plurality of online advertising data records.

10. The system of claim 1 further comprising a sixth processing node configured to identify a plurality of actions based, at least in part, on the plurality of data events included in the plurality of online advertising data records, the plurality of actions being responsive to a plurality of impressions included in the online advertisement campaign.

11. The system of claim 1, wherein the data storage system is a distributed file system.

12. A device comprising:
  a data aggregator comprising one or more processors configured to receive a plurality of online advertising data records, the plurality of online advertising data records including a plurality of data events characterizing a plurality of interactions between at least one user and an online advertisement campaign, and the plurality of online advertising data records including timestamp data characterizing a plurality of creation dates associated with the plurality of data events, wherein the data aggregator is a first pipelined stage;
  an intermediate data object generator comprising one or more processors configured to generate a plurality of intermediate data objects by partitioning at least some of the plurality of online advertising data records based on a first plurality of temporal data categories, each temporal data category of the first plurality of temporal data categories representing a different unit of time, and each intermediate data object of the plurality of intermediate data objects being associated with a temporal data category of the first plurality of temporal data categories, wherein the intermediate object generator is a second pipelined stage configured to store the plurality of intermediate data objects in a data storage system that is queryable by a query system; and
  a performance data object generator comprising one or more processors configured to generate a plurality of performance data objects by partitioning the plurality of intermediate data objects based on a second plurality of temporal data categories, the second plurality of temporal data categories being different than the first plurality of temporal data categories, and each performance data object of the plurality of performance data objects being associated with a temporal data category of the second plurality of temporal data categories, wherein the performance data object generator is a third pipelined stage configured to generate the plurality of performance data objects based on the plurality of intermediate data objects received from the second pipelined stage and store the plurality of performance data objects in the data storage system such that a query may be executed by the query system on both the plurality of intermediate data objects and the plurality of performance data objects.

13. The device of claim 12, wherein the data aggregator is further configured to:
generate a plurality of aggregate data objects by partitioning the online advertising data records based on a third plurality of temporal data categories, the plurality of aggregate data objects being generated incrementally, and the generating of the plurality of aggregate data objects being responsive to receiving at least some of the plurality of online advertising data records.

14. The device of claim 12, wherein each intermediate data object of the plurality of intermediate data objects includes a sequential representation of at least one online advertising data record identified based on a temporal category of the first plurality of categories, and wherein the first plurality of temporal data categories includes at least one of a day, week, and month.

15. The device of claim 14, wherein at least one performance data object of the plurality of performance data objects is generated by combining two or more intermediate data objects, and wherein the plurality of intermediate data objects and the plurality of performance data objects are stored in a data storage system configured to process performance data queries.

16. The device of claim 15, wherein the query system further comprises a query node configured to:
receive a query request from an advertisement campaign management application program interface (API);
execute the query on the plurality of intermediate data objects and the plurality of performance data objects stored in the data storage system; and
generate a result object that includes a result of the query, wherein 5 result object includes a combination of at least one intermediate data object and at least one performance data object.

17. The device of claim 16, wherein the query node is configured to:
identify the at least one intermediate data object and at least one performance data object included in the combination based, at least in part, on the first and second temporal data categories associated with the at least one intermediate data object and at least one performance data object; and
include the at least one intermediate data object and at least one performance data object in the result object.

18. One or more computer readable media having instructions stored thereon for performing a method, the method comprising:
receiving a plurality of online advertising data records, the plurality of online advertising data records including a plurality of data events characterizing a plurality of interactions between at least one user and an online advertisement campaign, and the plurality of online advertising data records including timestamp data characterizing a plurality of creation dates associated with the plurality of data events;
generating a plurality of intermediate data objects by partitioning at least some of the plurality of online advertising data records based on a first plurality of temporal data categories, each temporal data category of the first plurality of temporal data categories representing a different unit of time, and each intermediate data object of the plurality of intermediate data objects being associated with a temporal data category of the first plurality of temporal data categories; and
generating a plurality of performance data objects by partitioning the plurality of intermediate data objects based on a second plurality of temporal data categories, the second plurality of temporal data categories being different than the first plurality of temporal data categories, and each performance data object of the plurality of performance data objects being associated with a temporal data category of the second plurality of temporal data categories,
wherein the generating of the plurality of intermediate data objects and the generating of the plurality of performance data objects is pipelined, and wherein the plurality of performance data objects and the plurality of intermediate data objects are stored in a data storage system such that a query may be executed by a query system on both the plurality of intermediate data objects and the plurality of performance data objects.

19. The one or more computer readable media recited in claim 18, wherein the method further comprises:
receiving a query request from an advertisement campaign management application program interface (API);
executing the query on the plurality of intermediate data objects and the plurality of performance data objects; and
generating a result object that includes a result of the query, wherein result object includes a combination of at least one intermediate data object and at least one performance data object.

\* \* \* \* \*